United States Patent
Kassas et al.

(10) Patent No.: US 11,960,018 B2
(45) Date of Patent: Apr. 16, 2024

(54) RECEIVER DESIGN FOR DOPPLER POSITIONING WITH LOW EARTH ORBIT SATELLITES AND DIFFERENTIAL CARRIER PHASE MEASUREMENTS

(71) Applicant: The Regents of the University of California, Oakland, CA (US)

(72) Inventors: Zak Kassas, Irvine, CA (US); Joe Khalife, Irvine, CA (US); Ali Abdallah, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 254 days.

(21) Appl. No.: 17/604,154

(22) PCT Filed: Apr. 15, 2020

(86) PCT No.: PCT/US2020/028281
§ 371 (c)(1),
(2) Date: Oct. 15, 2021

(87) PCT Pub. No.: WO2020/214680
PCT Pub. Date: Oct. 22, 2020

(65) Prior Publication Data
US 2022/0171013 A1    Jun. 2, 2022

Related U.S. Application Data

(60) Provisional application No. 62/934,493, filed on Nov. 12, 2019, provisional application No. 62/834,317, filed on Apr. 15, 2019.

(51) Int. Cl.
*H04W 64/00* (2009.01)
*G01S 5/00* (2006.01)
(Continued)

(52) U.S. Cl.
CPC .......... *G01S 5/0284* (2013.01); *G01S 5/009* (2013.01); *G01S 5/0246* (2020.05)

(58) Field of Classification Search
CPC ....... G01S 5/0284; G01S 5/0246; G01S 5/009
See application file for complete search history.

(56) References Cited

U.S. PATENT DOCUMENTS 6,300,899 B1    10/2001    King
6,532,271 B1 *  3/2003    Hwang ............... H04L 27/2278
                                                    375/345
(Continued)

FOREIGN PATENT DOCUMENTS

JP        2000171499 A    6/2000

*Primary Examiner* — Moustapha Diaby
(74) *Attorney, Agent, or Firm* — Stites & Harbison PLLC; John Teresinski

(57) ABSTRACT

System and device configurations, and processes are provided for determining position based on low Earth orbit (LEO) satellite signals. Frameworks described herein can include performing Doppler frequency measurement for received quadrature phase shift keying (QPSK) signals. The framework may include channel tracking operations to determine Doppler shift measurements, a navigation filter operation to determine clock drift based on each Doppler shift measurement from each channel tracking loop, and determining position of a device based on LEO satellite signal sources. Frameworks described herein are also provided for carrier phase differential (CD)—low Earth orbit (LEO) (CD-LEO) measurements that may utilize a base and a rover without requiring prior knowledge of rover position. Embodiments can also cancel effects of ionospheric and tropospheric delays on the carrier phase and CD-LEO measurements.

20 Claims, 18 Drawing Sheets

(51) Int. Cl.
  *G01S 5/02* (2010.01)
  *H04W 4/02* (2018.01)

(56) References Cited

U.S. PATENT DOCUMENTS

| | | | |
|---|---|---|---|
| 2011/0238307 A1* | 9/2011 | Psiaki | G01S 19/31 |
| | | | 701/469 |
| 2015/0212211 A1* | 7/2015 | Wietfeldt | G01S 19/13 |
| | | | 342/357.74 |
| 2016/0066160 A1* | 3/2016 | Leclercq | H04W 64/006 |
| | | | 370/338 |
| 2017/0026797 A1* | 1/2017 | Venkataraman | G01S 19/46 |
| 2019/0120973 A1* | 4/2019 | Martin | G01S 19/44 |

* cited by examiner

RECEIVER DESIGN FOR DOPPLER POSITIONING WITH LOW EARTH ORBIT SATELLITES AND DIFFERENTIAL CARRIER PHASE MEASUREMENTS

CROSS-REFERENCE TO RELATED APPLICATIONS

This application is the National Stage entry under 35 U.S.C. § 371 of International Application No. PCT/US2020/028281, filed Apr. 15, 2020, which claims priority to U.S. Provisional Application No. 62/834,317 titled RECEIVER DESIGN FOR DOPPLER POSITIONING WITH LOW EARTH ORBIT SATELLITES filed on Apr. 15, 2019 and U.S. Provisional Application No. 62/934,493 titled ASSESSMENT OF DIFFERENTIAL CARRIER PHASE MEASUREMENTS FROM ORBCOMM LEO SATELLITE SIGNALS FOR OPPORTUNISTIC NAVIGATION filed on Nov. 12, 2019, the content of which is expressly incorporated by reference in its entirety.

STATEMENT OF GOVERNMENT SUPPORT

This invention was made with Government support under Grant No. N00014-16-1-2305 and Grant N00014-19-1-2511 awarded by the Office of Naval Research and in part by the National Science Foundation (NSF) under Grant 1929965. The Government has certain rights in the invention.

FIELD

The present disclosure generally relates to positioning and navigation using low Earth orbit (LEO) signals, frameworks for carrier phase differential (CD)—low Earth orbit (LEO) (CD-LEO) measurements and system and receiver configurations to determine position and extract Doppler measurements from LEO satellite signals.

BACKGROUND

Global navigation satellite systems (GNSS) have been at the heart of outdoor positioning systems. However, GNSS signals could become unusable in several instances (e.g., indoors, in deep urban canyons, near dense foliage, and in the presence of unintentional interference or intentional jamming) or untrustworthy (e.g., during malicious spoofing attacks). One alternative to GNSS signals for positioning may be low Earth orbit (LEO) satellites. However, LEO satellite signals are not intended for navigation can present challenges including the need for configurations and frameworks to allow for use of the signals.

Some existing approaches for low Earth orbit (LEO) satellite signals call for tailoring the broadband protocol to support navigation capabilities, while others exploit existing broadband LEO constellations for navigation in an opportunistic fashion. The former approaches allow for simpler receiver architectures and navigation algorithms. However, they require significant changes to existing infrastructure, the cost of which private companies, may not be willing to pay.

There exists a need for LEO satellite frameworks and configurations to allow for device configurations and frameworks to operate using downlink transmissions.

BRIEF SUMMARY OF THE EMBODIMENTS

Disclosed and claimed herein are systems, methods, and configurations for determining position based on low Earth orbit (LEO) satellite signals. In one embodiment a method includes receiving, by a device, one or more low earth orbit (LEO) satellite signals, wherein the LEO satellite signals include direct quadrature phase shift keying (QPSK) signals, and performing, by the device, a Doppler frequency measurement for the quadrature phase shift keying (QPSK) signals for each downlink channel received. The Doppler frequency measurement includes filtering each received downlink channel, and performing a channel tracking operation for each filtered downlink channel, the channel tracking operation including an independent phase-lock loop to track each filtered downlink signal, wherein each phase-lock loop determines a Doppler shift measurement. The method also includes performing, by the device, a navigation filter operation to determine clock drift based on each Doppler shift measurement from each channel tracking loop, and determining, by the device, a position of the device, wherein the device determines position based on clock drift determined by the navigation filter operation and tracking data for each LEO satellite signal source.

According to one embodiment, the channel tracking operation provides a downlink channel Doppler frequency estimate to the navigation filter operation to determine clock drift between a LEO satellite and the receiver.

According to one embodiment, the channel tracking operation includes an integrate and dump filter, a channel phase discriminator, and a channel loop filter in series, and a feedback loop including a numerically controller oscillator.

According to one embodiment, determining a position of the device is based on altimeter data detected for the device, and LEO satellite data including a velocity vector and position for each LEO satellite.

According to one embodiment, the navigation filter operation includes at least one of an extended Kalman filter and weighted non-linear least-squares (WNLS) estimator.

According to one embodiment, the method includes receiving base receiver position data and carrier phase data from a base receiver, wherein position of the device is determined based on a carrier phase differential operation with the base receiver position data and the carrier phase data as input.

According to one embodiment, the base receiver is at least one of a mobile receiver and stationary receiver, and wherein the device is configured to receive the base receiver position data and carrier phase data from the base receiver.

According to one embodiment, determining position includes canceling at least one of ionospheric delay and tropospheric delay from received satellite signals.

According to one embodiment, position is determined for the device when stationary and measurement collected at different times in a batch estimator.

According to one embodiment, a double-difference operation is performed to obtain carrier phase measurement differences from multiple LEO satellites.

Another embodiment is directed to a device configured to determine position based on low Earth orbit (LEO) satellite signals. The device includes a communications module configured to receive one or more low earth orbit (LEO) satellite signals, the LEO satellite signals include direct quadrature phase shift keying (QPSK) signals. The device includes a controller coupled to the communications module. The controller is configured to perform a Doppler frequency measurement for the quadrature phase shift keying (QPSK) signals for each downlink channel received. The Doppler frequency measurement includes filtering each received downlink channel, and performing a channel tracking operation for each filtered downlink channel. The channel tracking operation including an independent phase-lock loop to track each filtered downlink signal, wherein each phase-lock loop determines a Doppler shift measurement. The controller is also configured to perform a navigation filter operation to determine clock drift based on each Doppler shift measurement from each channel tracking loop. The controller is configured to determine a position of the device, wherein the device determines position based on clock drift determined by the navigation filter operation and tracking data for each LEO satellite signal source.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
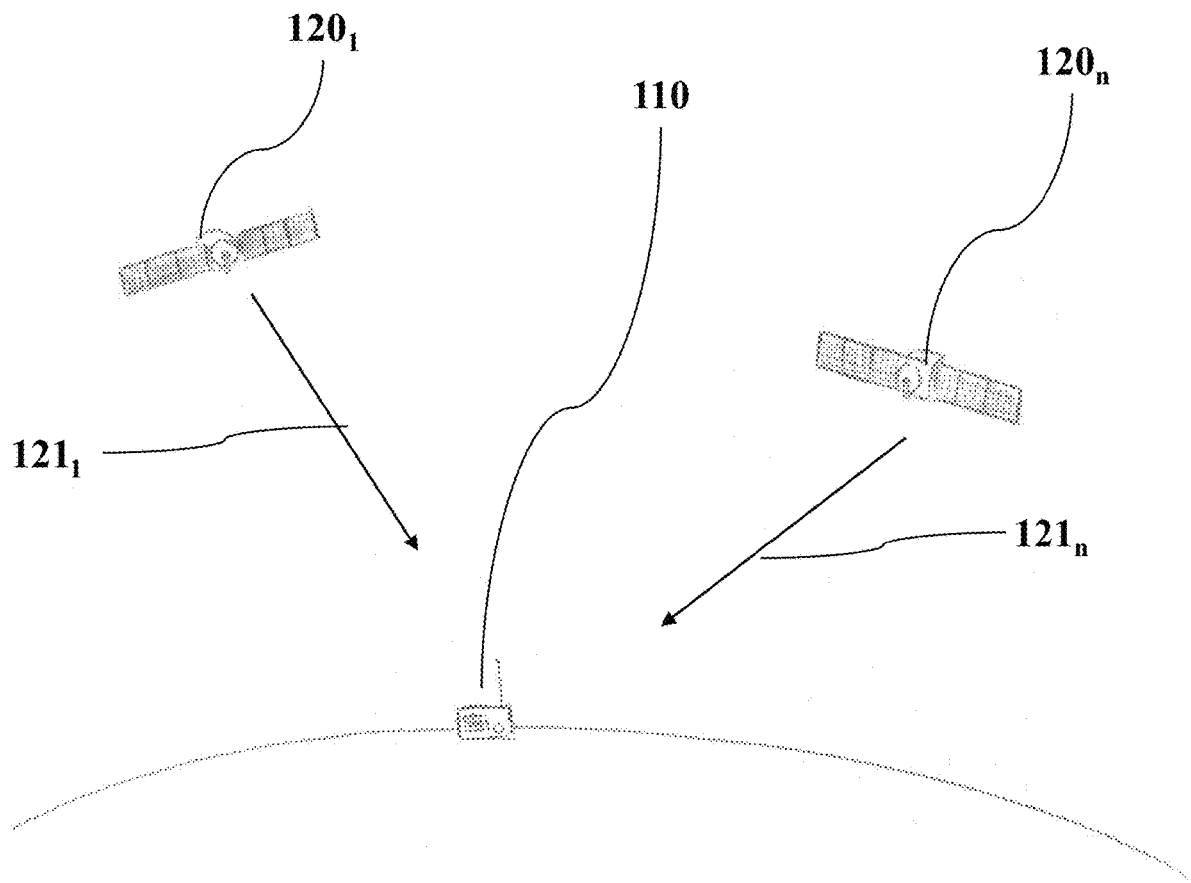
FIG. 1 is a graphical representation of device configured to receive signals from a plurality of low Earth orbit satellites according to one or more embodiments.

Embodiments allow for opportunistic navigation with differential carrier phase measurements from broadband LEO satellite signals. Opportunistic navigation, or navigation with signals of opportunity (SOPs), has been recently considered as a reliable alternative paradigm to GNSS navigation. Besides broadband LEO satellite signals, other SOPs include AM/FM radio, WiFi, and cellular, with the latter showing the promise of a submeter-accurate navigation solution for unmanned aerial vehicles when carrier phase measurements from cellular signals are used.

LEO satellites possess desirable attributes for positioning: (i) they are around twenty times closer to the Earth compared to GNSS satellites, which reside in medium Earth orbit (MEO), making their received signal power between 24 to 34 dBs higher than GNSS signals; (ii) they will become abundant as thousands of broadband Internet satellites are expected to be deployed into LEO; and (iii) each broadband provider will deploy broadband Internet satellites into unique constellations, transmitting at different frequency bands, making LEO satellite signals diverse in frequency and direction. Moreover, the Keplerian elements parameterizing the orbits of these LEO satellites are made publicly available by the North American Aerospace Defense Command (NORAD) and are updated daily in the two-line element (TLE) files. Using TLEs and orbit determination algorithms (e.g., SGP 4), the positions and velocities of these satellites can be known, albeit not precisely. In addition, some of these broadband LEO satellites, such as Orbcomm satellites, are equipped with GPS receivers and broadcast their GPS solution to the terrestrial receivers.

LEO satellite signals can be a free navigation source which alleviate the need for other costly aiding-sensors. LEO satellites transmit at a wide range of frequencies and directions, making them an attractive supplement to GNSS signals to improve the accuracy of a navigation solution. Moreover, LEO satellite signals are abundant in GNSS-challenged environments, making them particularly attractive navigation sources when GNSS signals become unreliable.

One or more features are described to address challenges of position determination and navigation using LEO satellites. As LEO satellite signals are not intended for navigation, embodiments are directed to use LEO satellite signals for navigation including: 1) receivers that can extract navigation observables from these signals; and 2) navigation frameworks that can account for the unknown nature of the LEO satellite transmitter states (namely clock bias, drift, and/or position and velocity).

Systems, devices and methods are providing for low Earth orbit position detection and navigation. One aspect of the disclosure is directed to a receiver architecture to extract Doppler measurements from LEO satellite signals. In one embodiment, a receiver architecture may acquire and track LEO satellite quadrature phase shift keying (QPSK) signals and extract Doppler measurements to LEO satellites.

In one embodiment, the framework employs an extended Kalman filter (EKF) to estimate a receiver's position using Doppler frequency measurements from a plurality of LEO satellites. The satellites' positions and velocities may be known through two-line element (TLE) files.

In another embodiment, an extended Kalman filter (EKF) or weighted non-linear least-squares (WNLS) estimator may be employed to fuse Doppler measurements from LEO satellite signals with altimeter measurements to estimate the position of the receiver. The LEO satellites' positions and velocities may be known through two-line element (TLE) files.

In one embodiment, 11 m positioning accuracy may be achieved with 25 LEO satellites. In one embodiment, a receiver is able to estimate its position using Doppler measurements from 2 LEO satellites with an accuracy of 360 m over a 1-minute period.

Another aspect of the disclosure is directed to positioning with carrier phase differential (CD)—low Earth orbit (LEO) (CD-LEO) measurements. Embodiments are directed to a CD-LEO framework. In certain embodiments, the framework utilizes a base and a rover, and enables navigation with the Orbcomm LEO constellation without requiring prior knowledge of the rover's position. Features are provided to cancel and/or account for the effect of ionospheric and tropospheric delays on the carrier phase and CD-LEO measurements. The disclosure discusses residual ionospheric and tropospheric delays as a function of the baseline. In addition, a discussion is provided for position dilution of precision (PDOP) for an Orbcomm constellation, and it is found that a less than unity PDOP may be achieved for 8-minute wait times. Experimental results show a receiver positioning itself exclusively with CD-LEO measurements from two Orbcomm satellites with a position error of 11.93 m.

In one embodiment, a system includes a rover and a base receiver with one or more visible LEO SVs. The base receiver is configured to determine its own position state. The base receiver is configured to communicate its own position and carrier phase observables to the rover. The rover is configured to determine position based on base receiver provided carrier phase observables. According to another embodiment, the rover is also configured to determine position based on base receiver provided carrier phase observables and carrier phase differential (CD)—low Earth orbit (LEO) (CD-LEO) measurements.

The disclosure considers the problem of positioning exclusively with LEO satellite signals in the inevitable case where GNSS signals become unavailable or unreliable (e.g., in jammed or spoofed environments). To this end, there are several challenges to overcome, mainly the absence of: (i) publicly available receivers that can extract navigation observables from LEO satellite signals, (ii) source of error characterization for designing LEO satellite navigation frameworks, and (iii) performance analyses tools to evaluate these frameworks.

Embodiments discussed herein provide solutions to challenges for Orbcomm constellation. First, a carrier phase differential (CD)-LEO navigation framework is developed for real broadband LEO satellite signals. Second, the estimability of the receiver's position is studied and a rule of thumb for setting the size of the batch estimator from the number of available satellites to meet performance requirements is developed. Third, the effect of residual ionospheric and tropospheric delays on the double-difference carrier phase measurements is studied, and the tradeoff between coverage and accuracy is discussed.

The high precision of carrier phase measurements enables very precise navigation, as demonstrated in GPS and cellular SOPs. However, this precision comes at the cost of added ambiguities that need to be estimated. Consider a receiver on-board a "rover" on Earth making carrier phase measurements to broadband LEO satellites and a "base" station in the vicinity of the rover making carrier phase measurements to the same LEO satellites. One can form the double-difference carrier phase measurements from the base and rover measurements and solve for the rover's position as well as for the resulting ambiguities. One important measure of the estimability (or degree of observability) of the rover's position is the position dilution of precision (PDOP). If no position prior is available, the rover cannot perform real-time positioning and must wait until there is enough change in satellite geometry and solve a batch least-squares to estimate its position and the carrier phase ambiguities. A significant change in geometry may be required for current broadband LEO constellations where the average number of visible satellites is less than three. The wait time depends on several variables but is mainly determined by the desired PDOP and the number of available satellites. Fortunately, due to the desirable properties of LEO, this wait time is much less than in the case of GPS.

Aside from carrier phase ambiguities, another major source of error that has to be considered in the CD-LEO framework is the ionospheric and tropospheric delays, since most broadband LEO constellations reside above the ionosphere. The magnitude of the ionospheric delay is (i) inversely proportional to the square of the carrier frequency and (ii) proportional to the obliquity factor, which is related to the elevation angle. This relationship becomes crucial for the proposed framework since: (i) Orbcomm satellite signals, which are transmitted in the very high frequency (VHF) band, will experience significantly larger ionospheric delays than GPS L1 signals, and (ii) due to Orbcomm satellites residing in LEO orbits, the obliquity factor changes significantly between different points on Earth, which introduces large ionospheric and tropospheric delay residuals. Although the double-difference carrier phase measurements will cancel out most of the errors due to ionospheric delays, there will still be significant errors if the base and rover are "too" far apart. For relatively long baselines, these errors become too large to be ignored if an accurate navigation solution is desired. Subsequently, there exists a tradeoff between coverage and accuracy, in that one would like to minimize the number of differential base stations needed while guaranteeing a certain accuracy.

The disclosure describes a carrier phase measurement model, and ionospheric and tropospheric delay models. For CD-LEO framework described herein, performance is characterized by studying the PDOP and the residual ionospheric and tropospheric delays for the Orbcomm constellation. Experimental results are provided to demonstrate a receiver positioning with the proposed CD-LEO framework.

In association with certain embodiments, experimental results are described for using proprietary Orbcomm software-defined receivers (SDRs) developed at the Autonomous Systems Perception, Intelligence, and Navigation (ASPIN) laboratory. The SDRs are implemented on a host computer with a universal software radio peripheral (USRP) serving as an RF front-end. The GPS-based LEO satellite positions are decoded from the transmitted Orbcomm satellite messages. Experimental results are presented showing a receiver localizing itself with real Orbcomm satellite signals using the proposed CD-LEO framework with a position error of 11.93 m.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "ground-truth" refers to the actual location of an object on the ground, as opposed to the location of an object as determined by a global positioning system.

As used herein, the term "cross-track" refers to the distance between an object's expected transit path and an object's actual transit path.

As used herein, the term "along-track" refers to the distance between an object's expected position along a transit path and the object's actual position along the transit path.

The character "L" refers hereinafter to the last member of a set or the total count of members in a set. The character "1" refers hereinafter to a variable member of a set. The characters "A", "B", "C", etc. refer to a specific but otherwise undefined member of a set. The character "T" refers hereinafter to a length of sampling time. The character "i" refers hereinafter to a time index.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 is a graphical representation of device configured to receive signals from a plurality of low Earth orbit satellites according to one or more embodiments. FIG. 1 shows receiver 110 configured to receive signals, such as downlink transmissions, from a plurality of low Earth orbit satellites. In one embodiment, the receiver 110 is a stationary radio frequency (RF) receiver. Receiver 110 may be equipped with an altimeter. The receiver 110 may detect multiple low Earth Orbit (LEO) satellites, such as satellites $120_{1-n}$, and downlink channels $121_n$, wherein direct quadrature phase shift keying (QPSK) signals are transmitted. Receiver 110 may be configured to detect downlink signals and transmission from one or more visible low earth orbit (LEO) satellites.

In one embodiment, the state information for the receiver 110 consists of a three-dimensional (3-D) position vector of the receiver 110 and a clock drift of the receiver 110. The receiver 110 is assumed to be stationary with a constant clock drift. It is also assumed that the clock drifts of each of the plurality of LEO satellites $120_{1-n}$, are constant. The 3-D position and velocity vectors of the LEO satellites $120_{1-n}$, may be obtained using satellite data (e.g., TLE files, SGP 4 orbit determination software, etc.). In one embodiment, the overall EKF state vector consists of the receiver's 3-D position and the difference between the clock drift of the receiver 110 and the clock drifts of each of the plurality of LEO satellites $120_{1-n}$.

According to one embodiment, receiver 110 may be configured to determine its position based on the detection of downlink transmissions from satellites $120_{1-n}$, even when receiver 110 is unaware of its position and without the aid of global positioning data (e.g., GPS data). A framework for determining position by receiver and processes are described herein. Embodiments also describer processes and operations for a receiver, such as receiver 110, to receive base receiver data to aid in position determination.

Figure 2A:
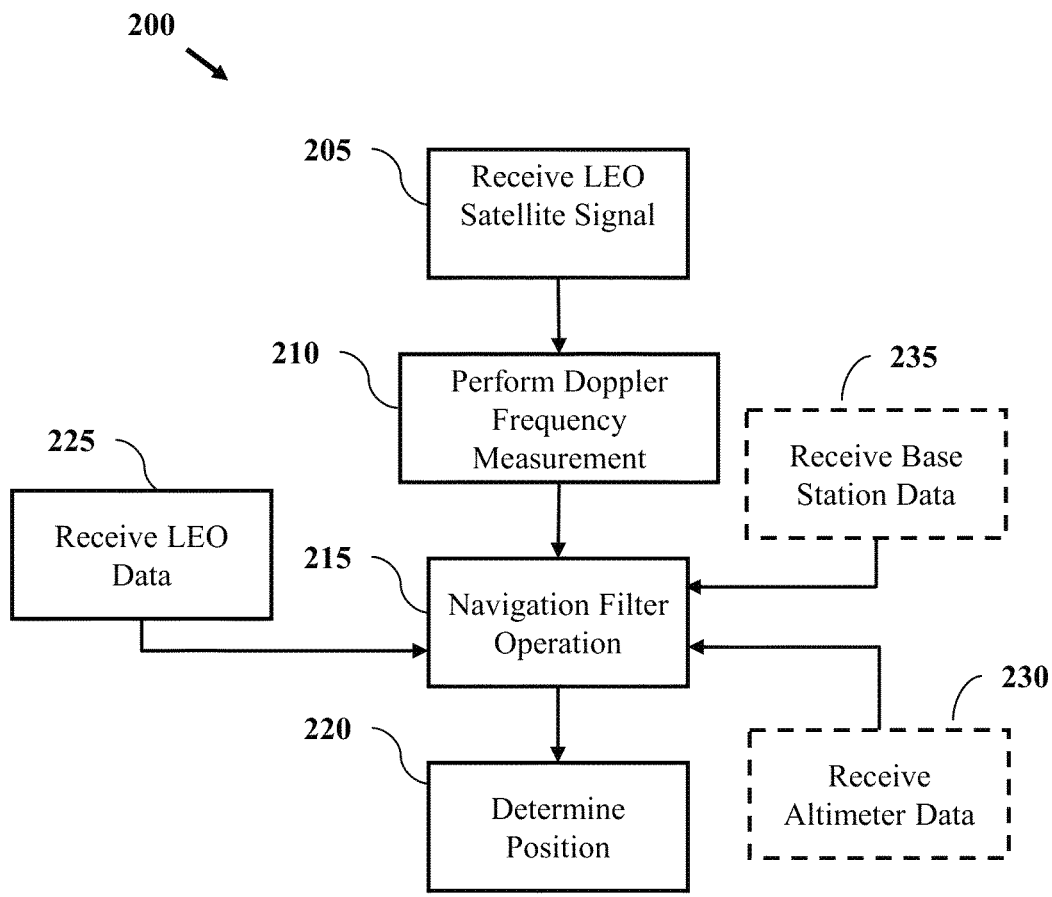
FIG. 2A illustrates a process for determining position using low Earth orbit (LEO) satellite signals according to one or more embodiments.

FIG. 2A illustrates a process for determining position using low Earth orbit (LEO) satellite signals according to one or more embodiments. According to one embodiment, process 200 may be performed by a device, such as a receiver (e.g., receiver 110). Process 200 may be initiated by a receiver detecting one or more transmissions from LEO satellites at block 205. The receiver may be configured to listen for one or more satellite signal. In one embodiment, signals detected by the receiver include direct quadrature phase shift keying (QPSK) signals. QPSK signals are digitally modulated and typically transmit two bits per symbol. As discussed herein, the QPSK signals, received from satellites, as well as satellite data can be used to determine a receivers position.

At block 210, process 200 includes a Doppler frequency measurement for the quadrature phase shift keying (QPSK) signals for each downlink channel received. Each satellite may provide a downlink signal that can be detected. According to one embodiment, a Doppler frequency measurement is performed by filtering each received downlink channel, and performing a channel tracking operation for each filtered downlink channel. Each channel is filtered to isolate a downlink channel for processing. In one embodiment, a low pass filter may be employed for each channel. Each channel may then be analyzed by a channel tracking operation including an independent phase-lock loop to track each filtered downlink signal, wherein each phase-lock loop determines a Doppler shift measurement. In certain embodiments, the channel tracking operation provides a downlink channel Doppler frequency estimate to the navigation filter operation to determine clock drift of the receiver. As will be discussed in FIG. 2B, a channel tracking operation can include an integrate and dump filter, a channel phase discriminator, and a channel loop filter in series, and a feedback loop including a numerically controller oscillator.

According to another embodiment, utilization of LEO satellite data may include canceling at least one of ionospheric delay and tropospheric delay from received satellite signals in block 210.

At block 215, a navigation filter operation is performed to determine clock drift based on each Doppler shift measurement from each channel tracking loop. In one embodiment, the navigation filter operation includes at least one of an extended Kalman filter and weighted non-linear least-squares (WNLS) estimator to determine clock drift. The navigation filter may be configured to receive downlink channel frequency estimates from each channel tracking loop to generate a difference vector between clock drift of the receiver and each of the LEOP satellite clock drifts.

At block 220, estimate of the position of the device can be determined. A receiver device can determine position based on clock drift determined by the navigation filter operation and tracking data for each LEO satellite signal source. As will be discussed below, satellite data may be received for each LEO satellite at block 225 that includes a position and tracking vector for each LEO satellite. As will be described herein, satellite tracking data may be provided to each receiver by one or more data transmissions or files (e.g., TLE files). LEO satellite data can include a velocity vector and position for each LEO satellite. In certain embodiments, LEO satellite data can include trajectories and position. A position determination may be an estimate, with accuracy dependent on the number of LEO satellites and one or more batch comparisons. In one embodiment, position is determined for the device when the device is stationary and measurement data is collected at different times, or over a time period. The measurement data may be combined in a batch estimator.

According to certain embodiments, each receiver device may include an altimeter or communications module to receiver altimeter data for use in determining receiver position relative to one or more LEO satellites. At optional block 230, altimeter may be received. Determining a position of the device may be based on altimeter data detected and/or received for the device.

In certain embodiments, each receiver may receive base station data from a base station configured to receive LEO satellite downlink channels at optional block 235. As will be described in more detail below, the a double-difference operation is performed to obtain carrier phase differential measurement from multiple LEO satellites. At block 235, base receiver position data and carrier phase data may be received from a base receiver. Position of the device is determined based on a carrier phase differential operation with the base receiver position data and the carrier phase data as input. Base receivers may be at least one of a mobile receiver and stationary receiver. Base receivers may wireless transmit (e.g., VHF transmissions, etc.), such that a receiver device can receive the base receiver position data and carrier phase data from the base receiver.

Figure 2B:
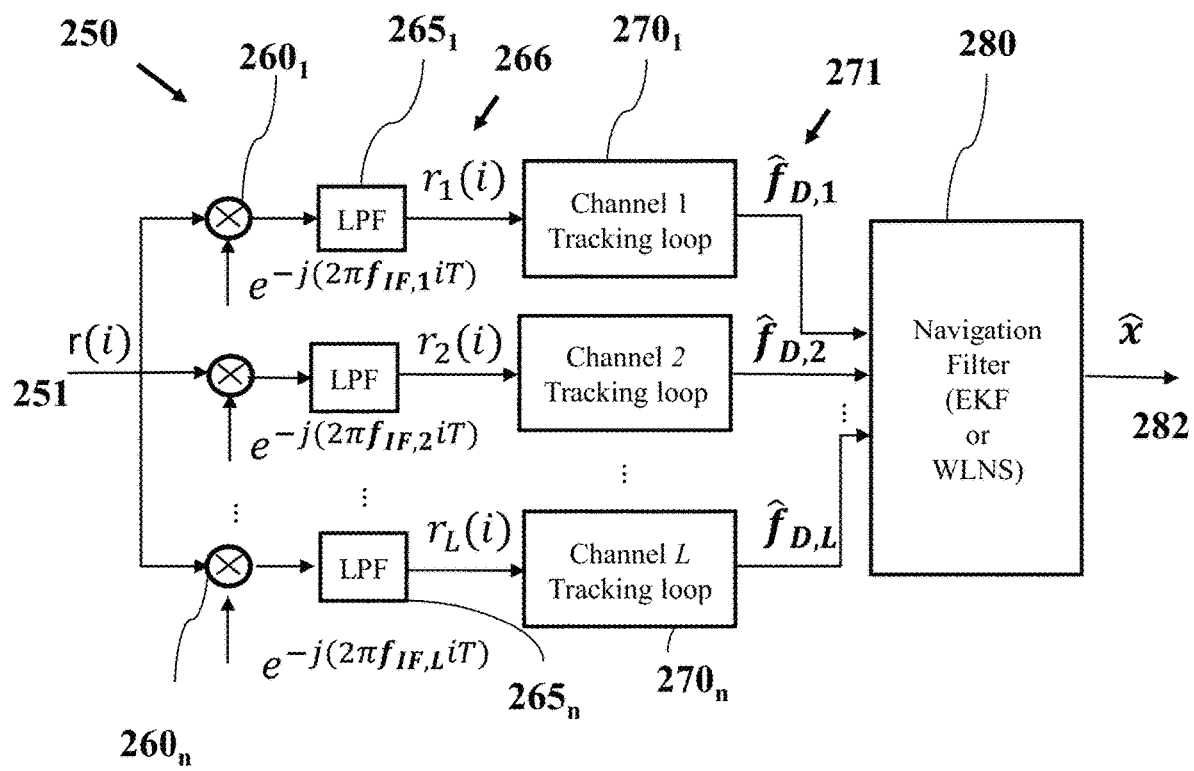
FIG. 2B illustrates Doppler frequency measurement and position determination from a plurality of low Earth orbit satellites according to one or more embodiments.

FIG. 2B depicts Doppler frequency measurement operations 250 and position determination from a plurality of low Earth orbit satellites which may be performed by a receiver (e.g., receiver 110). According to one embodiment, operations shown in FIG. 2B may relate to a framework for acquiring a Doppler frequency measurement of each downlink channel received. A receiver (e.g., receiver 110) performing operations 250 may relate to a stationary radio frequency (RF) receiver.

Operations 250 may relate to one or more operations of a receiver architecture to extract Doppler measurements from LEO satellite signals. An extended Kalman filter (EKF) may be employed to fuse Doppler measurements from LEO satellite signals with altimeter measurements to estimate the position of the receiver. The LEO satellites' positions and velocities may be known through two-line element (TLE) files. In one embodiment, a receiver architecture may acquire and track LEO satellite quadrature phase shift keying (QPSK) signals and extract Doppler measurements to LEO satellites. In one embodiment, a framework employs an extended Kalman filter (EKF) to estimate a receiver's position using Doppler frequency measurements from a plurality of LEO satellites. The satellites' positions and velocities may be known through two-line element (TLE) files. In one embodiment, 11 m positioning accuracy may be achieved with 25 LEO satellites. In one embodiment, a receiver is able to estimate its position using Doppler measurements from 2 LEO satellites with an accuracy of 360 m over a 1-minute period.

Downlink signals received by a receiver from one or more LEO satellites are shown generally as 251. In one embodiment, receiver 110 makes Doppler frequency measurements $\hat{f}_D$ to each of the available LEO satellites $120_{1-n}$ and uses these measurements along with altimeter measurements to estimate the position of the receiver 110 using an extended Kalman filter (EKF). In one embodiment, a navigation filter system receives a signal r(i) as input which may represent the totality of signals from the plurality of LEO satellites $120_{1-n}$. In one embodiment, the navigation filter system 200 may separate the signals into individual channel signals 266 ($r_{1-L}(i)$) by means of a plurality of mixers $260_{1-n}$, to separate downlink channels and filters $265_{1-n}$ for filtering downlink channel signals (e.g., low pass filters). Doppler measurements 271 ($\hat{f}_{D,1-L}$) generated from a plurality of downlink channels is fed to a navigation filter 280. Each individual channel signal may be provided to a channel tracking loop, such as channel tracking loops $270_{1-n}$.

According to one embodiment, a receiver employs independent phase-locked loops (PLLs) to track the LEO satellite $120_{1-n}$, signals on each downlink channel. Channel tracking loops $270_{1-n}$, detect Doppler shifts produced by the PLLs which are output to the navigation filter 280, which can be an EKF or a weighted nonlinear least-squares (WNLS) estimator. Navigation filter 280 may perform navigation filter operations for output of position data 282. The measurements used in the EKF consist of the altitude of the receiver 110, as measured by the altimeter, and Doppler frequencies to each of the available LEO satellites $120_{1-n}$.

Figure 2C:
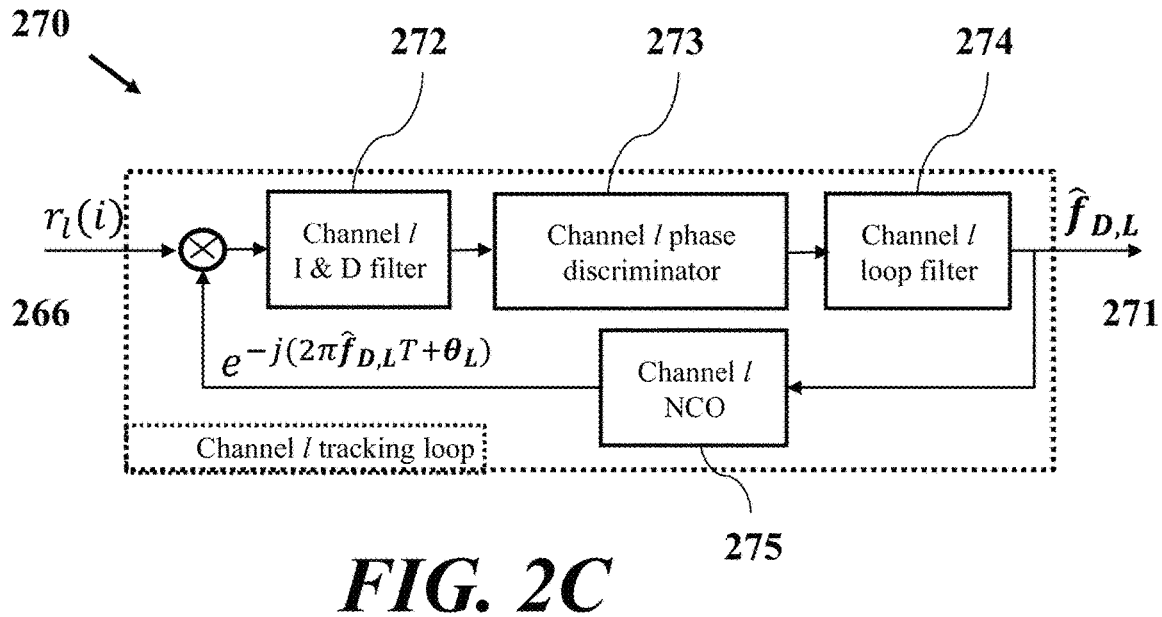
FIG. 2C illustrates a tracking loop according to one or more embodiments.

FIG. 2C is a block diagram depicting a tracking loop 270 directed to producing a Doppler measurement $\hat{f}_{D,L}$ for a member of the plurality of downlink channels. Tracking loop may relate to operations of each of the channel tracking loops $270_{1-n}$. According to one embodiment, tracking loop 270 includes a feedback loop having integrate and dump (I&D) filter 271, a phase discriminator 273, a loop filter 274, and a numerically controlled oscillator (NCO) 275. Integrate and dump (I&D) filter 271, a phase discriminator 273, and a loop filter 274 may be in series. Numerically controlled oscillator (NCO) 275 may be configured as part of the feedback loop between input 266 and output 271. According to one embodiment, the Fast Fourier Transform (FFT) method is used to acquire the Doppler frequency $\hat{f}_D$ for each channel.

Figure 3:
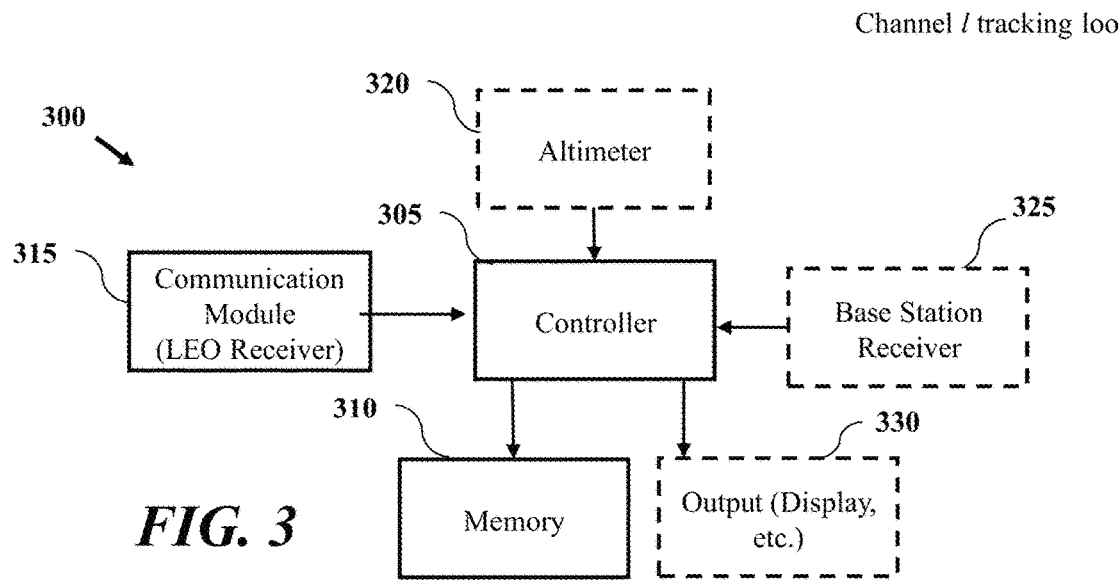
FIG. 3 depicts a device configuration according to one or more embodiments.

FIG. 3 depicts a device configuration according to one or more embodiments. Device 300 may relate to a receiver (e.g., receiver 110) configured to detect LEO satellite transmissions. According to one embodiment, receiver 300 includes controller 305, memory 310 and communications module 315. Controller 305 may relate to a processor or control device configured to execute one or more operations stored in memory 310, such as a framework for determining position based on measurement of low Earth orbit (LEO) satellite signals. Controller 305 may be coupled to memory 310 and communication module 315. Communication modules 315 may be configured to receive one or more low earth orbit (LEO) satellite signals, including direct quadrature phase shift keying (QPSK) signals. Controller 305 may be configured to perform a Doppler frequency measurement for the quadrature phase shift keying (QPSK) signals for each downlink channel received and perform a navigation filter operation to determine clock drift based on each Doppler shift measurement from each channel tracking loop. According to one embodiment, controller 305 is configured to determine a position of the device based on clock drift determined by the navigation filter operation and tracking data for each LEO satellite signal source. Tracking data for each LEO satellite source may be received by communications module 315 by way or wireless communication.

In certain embodiments the navigation filter operation by controller 305 is based on altimeter data received by optional altimeter 320. According to another embodiment, controller 305 may optionally receive base station receiver data at block 325. Device 300 may include optional output 330 to display position data and/or to output position determinations to one or more other devices.

Simulations and experimental results were determined for LEO Doppler positioning receivers as described herein. In one simulation, a receiver position estimate was initialized around 28 km from ground truth. Simulated Leo satellite trajectories were generated using TLE data of three satellite constellations with uncertainties of 10 m cross track and 100 m along track. The number of simulated LEO satellites varied between 5 and 25 increments of 5, and an extended Kalman filter (EKF) navigation filter was ran for 1, 2, and 4 minutes. For each number of satellite and duration pair, 100 Monte Carlo runs were performed. Table 1 below provides final position root mean-squared error (RMSE) values, wherein the values are a function of the number of simulated LEO satellites (L) and the length of duration ($\Delta T$) of the EKF.

TABLE 1

| | L | | | | |
|---|---|---|---|---|---|
| $\Delta T$ | 5 | 10 | 15 | 20 | 25 |
| 1 minute | 168.53 | 100.78 | 74.01 | 55.52 | 37.95 |
| 2 minutes | 111.25 | 84.12 | 50.03 | 31.34 | 20.27 |
| 4 minutes | 28.30 | 27.10 | 20.93 | 17.63 | 11.38 |

Figure 4A:
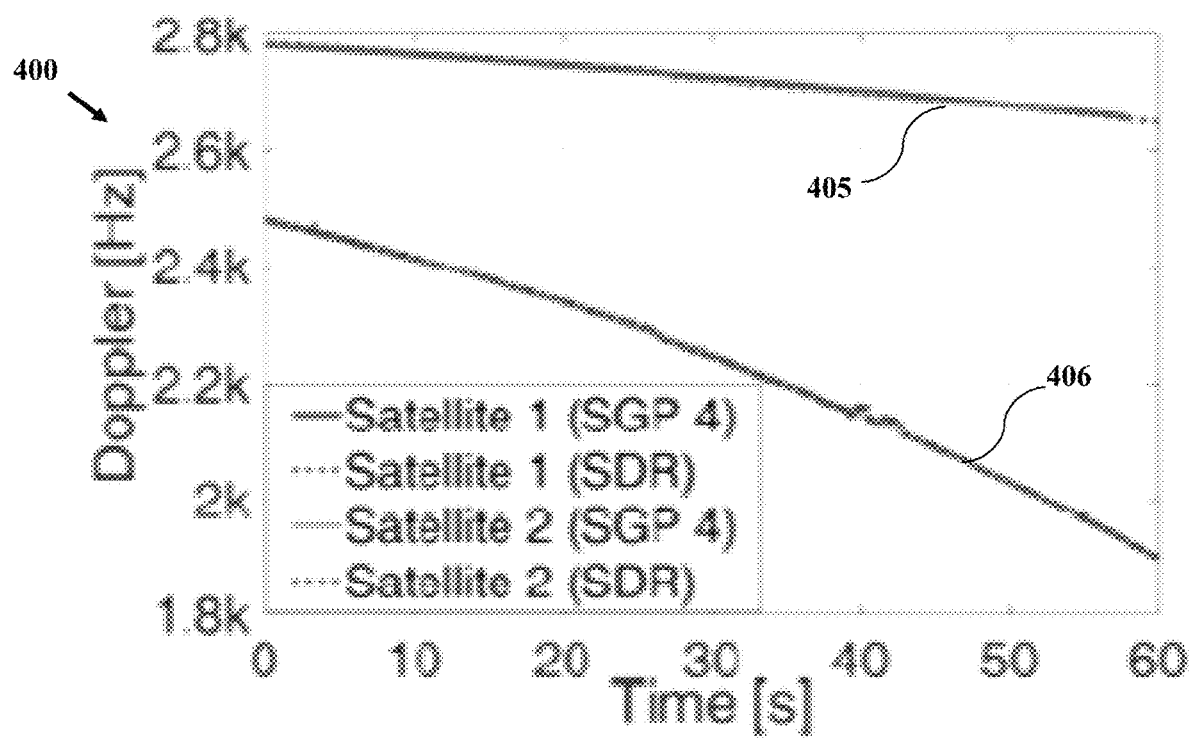
FIG. 4A is illustrates Doppler frequency values according to one or more embodiments.

FIG. 4A shows graph 400 depicting a comparison of the expected Doppler frequency values and the experimentally measured Doppler frequency values. For the experimental results, a multipurpose low-cost very high frequency (VHF) dipole antenna and an RTL-SDR dongle were used to sample Orbcomm signals. The samples were stored on a laptop and then processed by the proposed receiver (e.g., receiver 110), which was implemented as a software-defined radio (SDR).

The true altitude of the antenna was used in the initial position estimate since no altimeter measurements were available. Over the course of the experiment, 2 Orbcomm LEO satellites (e.g., satellites 120)were available for 60 seconds, one transmitting at 137.3125 MHz and the other at 137.25 MHz. The satellite positions and velocities were obtained using SGP 4 propagation software written in MAT-LAB and TLE files available online. The receiver's position estimate was initialized around 28 km away from ground-truth.

The clock drift estimates in the EKF were initialized using the position prior and the first Doppler frequency measurements. The final horizontal position error in the EKF was 358 m. The expected Doppler obtained from SGP 4 propagation is shown in FIG. 4A along with the Doppler frequencies measured by the proposed SDR. FIG. 4A illustrates data for two satellites as results 405 and 406. Results 405 include data for Satellite 1 as both obtained from SGP 4 propagation and the proposed SDR. Results 406 include data for Satellite 2 as both obtained from SGP 4 propagation and the proposed SDR. The true receiver position 430, the final position estimate 420, and the final position uncertainty ellipse 410 are shown in FIG. 4B.

Figure 4B:
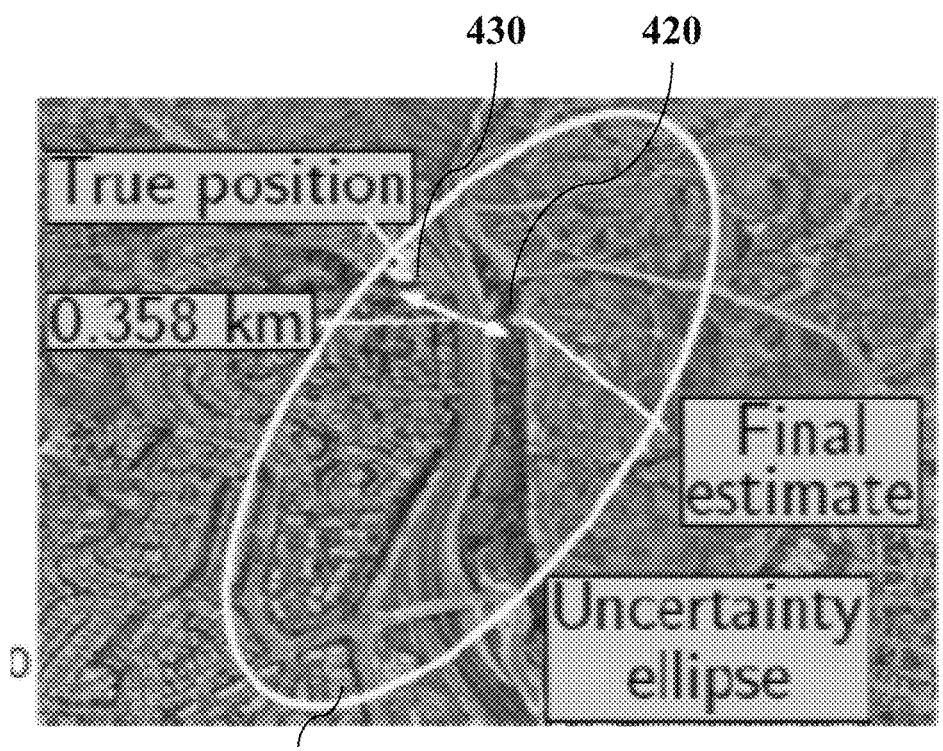
FIG. 4B illustrates receiver position according to one or more embodiments.

FIG. 4B illustrates receiver position according to one or more embodiments. FIG. 4B is a top view of a stationary receiver's position, wherein the stationary receiver's position is measured using Doppler measurements from 2 Orbcomm LEO satellites, and wherein the view includes an uncertainty ellipse 410, a marker of a final estimate 420 of the stationary receiver's position, and a marker of a true position 430 of the receiver 110.

Carrier Phase Measurement Model

One or more embodiments are directed to carrier phase measurement of LEO satellite signals and addressing ionospheric and tropospheric delay models.

Leo Carrier Phase Observation Model

One or more operations may be performed based on Doppler frequency measurements of Orbcomm LEO space vehicle (SV) signals from a navigation receiver described herein. The continuous-time carrier phase observable can be obtained by integrating the Doppler measurement over time. The carrier phase (expressed in cycles) made by the i-th receiver on the l-th LEO SV is given by $$\phi_l^{(i)}(t) = \phi_l^{(i)}(t_0) + \int_{t_0}^{t} f_{D_l}^{(i)}(\tau)d\tau, \, l = 1_l, \ldots, L, \quad (1)$$

where $$f_{D1}^{(i)}$$

is the Doppler measurement made by the i-th receiver on the l-th LEO SV $\varphi_l^{(i)}(t_0)$ is the initial carrier phase, and L is the total number of visible LEO SVs. In (1), i denotes either the base B or the rover R. Assuming a constant Doppler during a subaccumulation period T, (1) can be discretized to yield $$\phi_l^{(i)}(t_k) = \phi_l^{(i)}(t_0) + \sum_{n=0}^{k-1} f_{D_l}^{(i)}(t_n)T, \quad (2)$$

where $t_k \triangleq t_0 + kTk$. In what follows, the time argument $t_k$ will be replaced by k for simplicity of notation. Note that the receiver will make noisy carrier phase measurements. Adding measurement noise and the ionospheric and tropospheric delays to (2) and expressing the carrier phase observable in meters yields $$z_l^{(i)}(k) = \lambda_l \phi_l^{(i)}(0) + \lambda_l T \sum_{n=0}^{k-1} f_{D_l}^{(i)}(n) + v_l^{(i)}(k), \quad (3)$$

where $\lambda_l$ is the wavelength of the carrier signal transmitted by the l-th LEO SV $v_l^{(i)}$ (k) is the measurement noise, which is modeled as a discrete-time zero-mean white Gaussian sequence with variance $\lceil \sigma_l^{(i)}(k) \rceil^2$ which can be shown to be given by $$[\sigma_l^{(i)}(k)]^2 = \frac{2\lambda_l^2 B_{i,PLL} T}{(SNR_l^{(i)}(k))^3} \left[ \frac{8}{g(SNR_l^{(i)}(k))^4} + \frac{20}{3(SNR_l^{(i)}(k))^3} + \frac{10}{3(SNR_l^{(i)}(k))^2} - \frac{8}{3(SNR_l^{(i)}(k))} + 2 \right]$$

where $B_{i,PLL}$ is the i-th receiver's phase lock loop (PLL) noise equivalent bandwidth and $SNR_l^{(i)}(k)$ is the l-th LEO SV signal-to-noise ratio at time-step k measured by the i-th receiver. Note that since LEO satellite orbits are above the ionosphere, their signals will suffer from ionospheric and tropospheric delays. Let $\delta t_{iono,l}^{(i)}(k)$ and $\delta t_{trop,l}^{(i)}(k)$ denote the ionospheric and tropospheric delays from the l-th LEO SV to the i-th receiver at time-step k, respectively.

Subsequently, the carrier phase in (3) can be parameterized in terms of the receiver and LEO SV states as $$z_l^{(i)}(k) = \|r_{r_i} - r_{leo_l}(k)\|_2 = c[\delta t_{r_i}(k) - \delta t_{leo_l}(k)] + \lambda_l N_l^{(i)} + c\delta t_{trop_i}^{(i)}(k) + c\delta t_{iono_i}^{(i)}(k) + v_l^{(i)}(k), \quad (4)$$

where $r_{r_i} \triangleq [x_{r_i}, y_{r_i}, z_{r_i}]^T$ is the i-th receiver's position vector; $r_{leo_l} \triangleq [x_{leo_l}, y_{leo_l}, z_{leo_l}]^T$ is the l-th LEO SV position vector; c is the speed of light; $\delta t_{r_i}$ and $\delta t_{leo_l}$ are the i-th receiver's and l-th LEO SV clock biases, respectively; and $N_l^{(i)}$ is the carrier phase ambiguity.

Ionospheric and Tropospheric Delays

For radio frequency (RF) signals transmitted at a carrier exceeding 1 MHz, the excess phase delay due to propagation in the ionosphere can be approximated by $$\delta t_{iono,l}^{(i)}(k) = -\frac{40.3 \times 10^6 \times \alpha_{iono}(\theta_l^{(i)}(k)) \times TECV^{(i)}(k)}{cf_{c,l}^2}, \quad (5)$$

where $\theta_l^{(i)}(k)$ is the elevation angle of the l-th LEO SV with respect to the i-th receiver at time-step k; $f_c l$ is the l-th LEO SV's carrier frequency; $\alpha_{iono}(\cdot)$ is the obliquity factor for a given elevation angle; and $TECV^{(i)}(k)$ is the total electron count at the i-th receiver's zenith (i.e., when the elevation angle is $\pi/2$). Note that $TECV^{(i)}(k)$ in (5) is expressed in TEC Units (TECU) and is assumed to be constant during satellite visibility. Note that a map for TECV for the i-th receiver's location at different times can be accessed online. The obliquity factor is given by $$\alpha_{iono}(n) = \left[ 1 - \left( \frac{R_E \cos u}{R_E + h_I} \right)^2 \right]^{-\frac{1}{2}}$$

where $R_E$ is the average radius of the Earth and $h_I$ is the mean ionospheric height, which is taken to be 350 km.

Tropospheric delays can be modeled as the sum of two terms: The first due to dry gazes in the atmosphere and the second due to water vapor in the atmosphere. The corresponding delays are called dry and wet delays, respectively, and the total tropospheric delay is modeled as $$\delta t_{trop,l}^{(i)}(k) = \delta t_{z,w}^{(i)} \alpha_{trop,w}(\theta_l^{(i)}(k)) + \delta t_{z,d}^{(i)} \alpha_{trop,d}(\theta_l^{(i)}(k)) \quad (6)$$

where $\delta t_{z,w}^{(i)}$ and $\delta t_{d,w}^{(i)}$ are the wet and dry delays at the i-th receiver's zenith, respectively, and $\alpha_{trop,d}(\cdot)$ and $\alpha_{trop,d}(\cdot)$ are the wet and dry tropospheric obliquity factors, respectively. The obliquity factors may be approximated by $$(\alpha_{trop,w}(u)) = \frac{1}{\sin u + \frac{0.00035}{\tan u + 0.017}}$$

$$(\alpha_{trop,d}(u)) = \frac{1}{\sin u + \frac{0.00143}{\tan u + 0.0445}}$$

Using the Hopfield model, the wet and dry delays may be approximated with $$\delta t_{z,w}^{(i)} = 0.373 \frac{e_0^{(i)}}{c(T_0^{(i)})^2} \frac{h_w}{5}, \; \delta t_{z,d}^{(i)} = 77.6 \times 10^{-6} \frac{P_0^{(i)}}{c(T_0^{(i)})^4} \frac{h_w}{5},$$

where $T_0^{(i)}$ is the temperature (kelvin), $P_0^{(i)}$ is the total pressure and $e_0^{(i)}$ is the partial pressure due to water vapor (both in millibars), $h_w = 12$ km, and $h_d \approx 43$ km [24].

Figure 5:
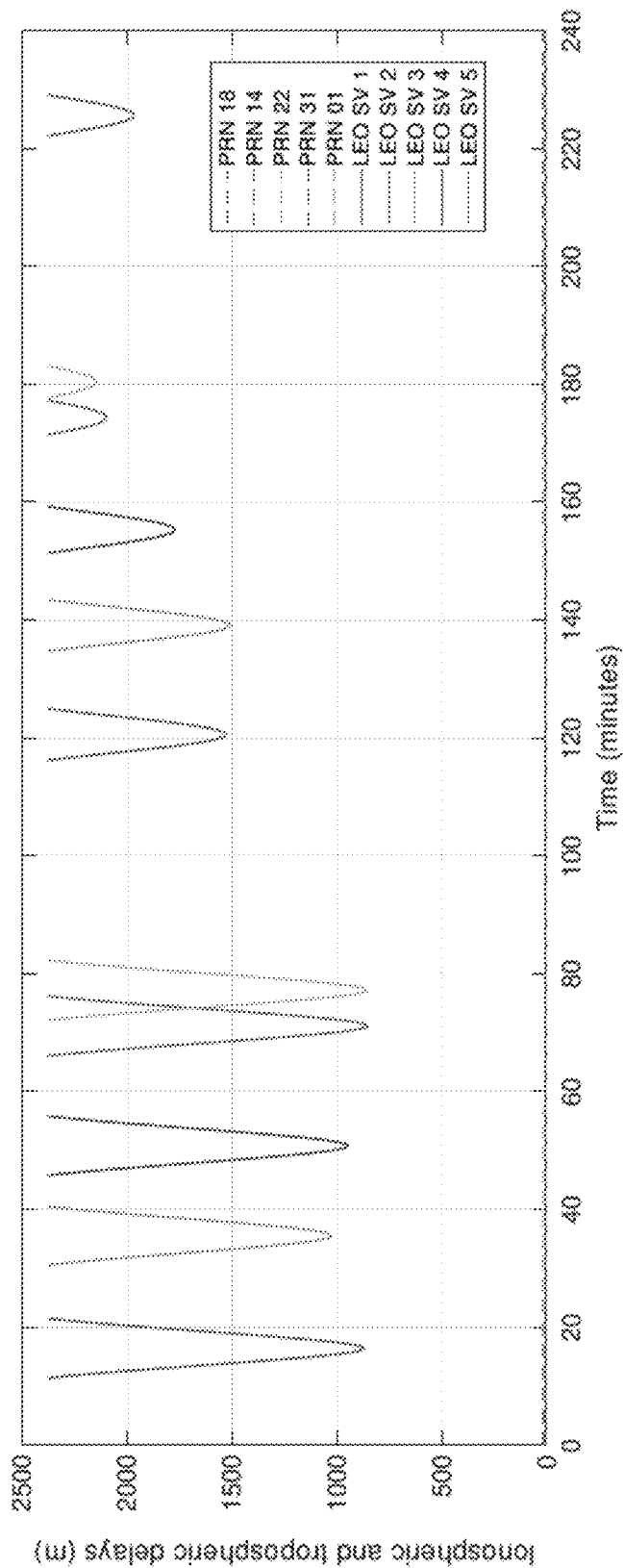
FIG. 5 depicts a graphical representation of the sum of simulated ionospheric and tropospheric delays according to one or more embodiments.

FIG. 5 shows the sum of simulated ionospheric and tropospheric delays for 5 Orbcomm LEO SVs transmitting in the VHF band and 5 GPS SVs at L1 frequency over a period of 4 hours. It can be seen that the ionospheric delays for Orbcomm SVs are orders of magnitude higher than those of GPS SVs due to the difference in transmit frequency.

Navigation with Leo Carrier Phase Differential Measurements

Figure 6:
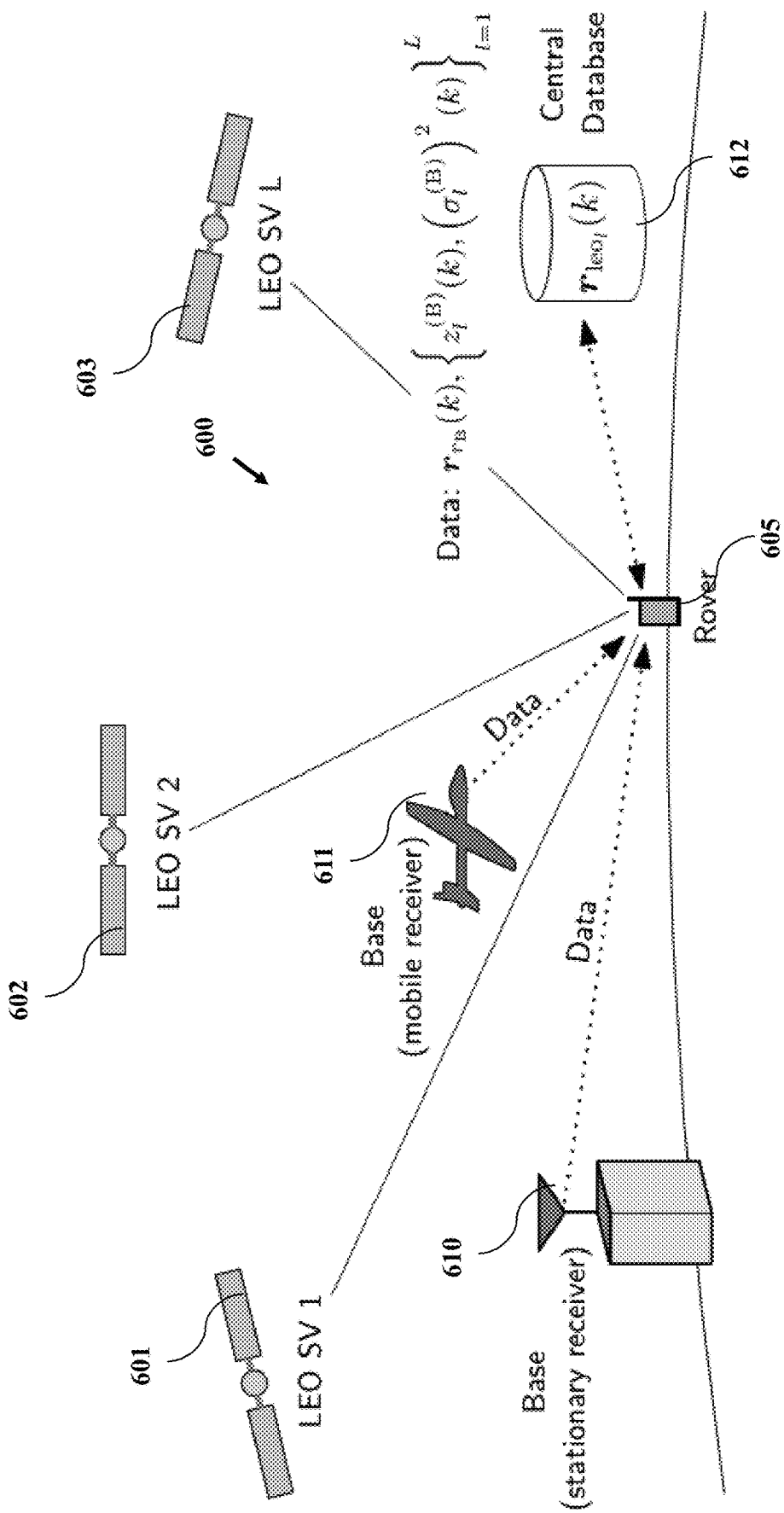
FIG. 6 illustrates a base/rover CD-LEO framework according to one or more embodiments.

One or more embodiments are directed to operations and a framework for CD-LEO navigation. FIG. 6 illustrates a base/rover CD-LEO framework according to one or more embodiments.

Cd-Leo Framework

According to one embodiment, a CD-LEO framework 610 includes a rover 605 and a base receiver (e.g., stationary base receiver 610 or mobile base receiver 611) in an environment having L visible LEO SVs (e.g., satellite 601, satellite 602, satellite 603). The base receiver (B), is assumed to have knowledge of its own position state, e.g., a stationary receiver deployed at a surveyed location (base receiver 610) or a high-flying unmanned aerial vehicle (UAV) (base receiver 611) with access to GNSS or one equipped with a sophisticated sensor suite. The rover 605 (R) does not have knowledge of its position. The base communicates its own position and carrier phase observables with the rover 605. The LEO SVs' positions are known through the TLE files and orbit determination software, or by decoding the transmitted ephemeris, if any.

In what follows, is an estimate position of rover 605, which will be achieved by double-differencing the measurements. Without loss of generality, let the measurements to the first LEO SV be taken as references to form the single difference $$z_{l+1}^{(i)}(k) \triangleq z_l^{(i)}(k) - z_1^{(i)}(k).$$

Subsequently, define the double difference between R and B as $$z_{l,1}^{(R,B)}(k) \triangleq z_{l,1}^{(R)}(k) - z_{l,1}^{(B)}(k) + \|r_{r_B} - r_{leo_l}(k)\|_2 - \|r_{r_B} - r_{leo_1}(k)\|_2 \triangleq h_{l,1}^{(R)}(k) + A_{l,1}^{(B)}(k) + c\Delta_{iono,1}^{(R,B)}(k) + c\Delta_{trop_l,1}^{(R,B)}(k) + v_{l,1}^{(R,B)}(k) \quad (7)$$

where $l = 1, \ldots, L$ and $$h_{l,1}^{(R)}(k) \triangleq \|r_{r_R} - r_{leo_l}(k)\|_2 - \|r_{r_R} - r_{leo_1}(k)\|_2 A_{l,1}^{(R,B)}(k)$$
$$\triangleq \lambda_l N_l^{(R)} - \lambda_l N_l^{(B)} - \lambda_1 N_1^{(R)} + \lambda_1 N_1^{(B)} \Delta_{iono_l,1}^{(R,B)}(k)$$
$$\triangleq \delta t_{iono,l}^{(R)}(k) - \delta t_{iono,l}^{(B)}(k) - \delta t_{iono,1}^{(R)}(k) - \delta t_{iono,1}^{(B)}(k) \Delta_{trop_l,1}^{(R,B)}(k) \triangleq \delta t_{trop,l}^{(R)}(k) - \delta t_{trop,l}^{(B)}(k) - \delta t_{trop,1}^{(R)}(k) - \delta t_{trop,1}^{(B)}(k) v_{l,1}^{(R,B)}(k) \triangleq v_l^{(R)}(k) - v_l^{(B)}(k) - v_1^{(R)}(k) - v_1^{(B)}(k)$$

Note that since $\lambda_1$ is not necessarily equal to $\lambda_1$, then $A_{l,1}^{R,B}$ cannot necessarily be expressed as $\lambda_1 M$, where M is an integer. Therefore, $A_{l,1}^{R,B}$ is hereafter considered as a real constant parameter. Moreover, this paper assumes complete knowledge of the base's position and accounts for it in the measurement defined in (7). Thus, it is expected that a mobile base and a static base will yield the same positioning performance. Define the vector of measurements $$z(k) \triangleq h_R(k) + A + c\Delta_{iono}(k) + c\Delta_{trop}(k) + v(k),$$

where $$z(k) \triangleq [z_{2,1}^{(R,B)}(k), \ldots z_{L,1}^{(R,B)}(k)]^T$$

$$h_R(k) \triangleq [h_{2,1}^{(R)}(k), \ldots, h_{L,1}^{(R)}(k)]^T$$

$$A \triangleq [A_{2,1}^{(R,B)}, \ldots, A_{L,1}^{(R,B)}]^T$$

$$\Delta_{iono}(k) \triangleq [\Delta_{iono_2,1}^{(R,B)}(k), \ldots, \Delta_{iono_L,1}^{(R,B)}(k)]^T$$

$$\Delta_{trop}(k) \triangleq [\Delta_{trop_2,1}^{(R,B)}(k), \ldots, \Delta_{trop_L,1}^{(R,B)}(k)]^T$$

$$v(k) \triangleq [v_{2,1}^{(R,B)}(k), \ldots, v_{L,1}^{(R,B)}(k)]^T$$

where v(k) has a covariance $R_{R,B}(k)$ which can be readily shown to be $$R_{R,B}(k) = R^{(1)}(k) + \{[\sigma_1^{(R)}(k)]^2 + [\sigma_1^{(B)}(k)]^2\} \Xi,$$

where $$R^{(1)}(k) \triangleq \mathrm{diag}\{[\sigma_2^{(R)}(k)]^2 + [\sigma_2^{(B)}(k)]^2, \ldots, [\sigma_L^{(R)}(k)]^2 + [\sigma_L^{(B)}(k)]^2\}$$

and $\Xi$ is a matrix of ones.

Batch Solution

The vector A is unknown and has to be solved for along with the rover's position. Using only one set of carrier phase measurement with no a priori knowledge on the rover position results in an underdetermined system: (L+2) unknowns with only (L−1) measurements. Therefore, when no a priori information on the position of the rover is known, the rover could remain stationary for a period of time such that enough variation in satellite geometry is observed. Subsequently, the rover uses measurements collected at different times in a batch estimator, resulting in an overdetermined system. Denote K the number of time-steps in which carrier phase measurements are collected to be processed in a batch, then the total number of measurements will be K×(L−1) while the total number of unknowns will remain L+2. Note that for L≥2, the resulting system is overdetermined for K≥4.

Define the collection of measurements from time-step 0 to K−1 as $$Z^K \triangleq [Z^T(0), \ldots, Z^T(K-1)]^T,$$

which can be expressed as $$z^K = h^K[r_{r_R}] + \bar{I}^K A + c\Delta_{iono}^K + c\Delta_{trop}^K + v^K,$$

$$h^K[r_m] \triangleq \begin{bmatrix} h_R(0) \\ \vdots \\ h_R(K-1) \end{bmatrix}, \bar{I}^K \triangleq \begin{bmatrix} I_{(L-1)\times(L-1)} \\ \vdots \\ I_{(L-1)\times(L-1)} \end{bmatrix},$$

$$\Delta_{iono}^K \triangleq \begin{bmatrix} \Delta_{iono}(0) \\ \vdots \\ \Delta_{iono}(K-1) \end{bmatrix}, \Delta_{trop}^K \triangleq \begin{bmatrix} \Delta_{trop}(0) \\ \vdots \\ \Delta_{trop}(K-1) \end{bmatrix}, v^K \triangleq \begin{bmatrix} v(0) \\ \vdots \\ v(K-1) \end{bmatrix},$$

where $v^K$ is the overall measurement noise with covariance $R^K \triangleq \mathrm{diag}\,[R_{R,B}(0), \ldots, R_{R,B}(K-1)]$. Note that the measurements in (8) contain the ionospheric and tropospheric delays, which can be estimated according to Subsection II-B. Let $\Delta_{iono}^K$ and $\Delta_{trop}^K$ denote the estimates of $\Delta_{iono}^K$ and $\Delta_{trop}^K$, respectively, with the associated estimation errors $$\tilde{\Delta}_{iono}^K \triangleq \Delta_{iono}^K - \hat{\Delta}_{iono}^K, \tilde{\Delta}_{trop}^K \triangleq \Delta_{trop}^K - \hat{\Delta}_{trop}^K$$

Subsequently, define the ionospheric delay- and tropospheric delay-free measurements $$\bar{z}^K \triangleq z^K - c(\hat{\Delta}_{iono}^K + \hat{\Delta}_{trop}^K),$$

$$= z^K[r_{r_R}] + \bar{I}^K A + \bar{v}^K,$$

where $\bar{v}^K = v^K + c\tilde{\Delta}_{iono}^K + c\tilde{\Delta}_{trop}^K$ is the overall measurement noise with the assumed covariance $$\bar{R}^K = R^K + \sigma_{iono,trop}^2 I_{K(L-1)\times K(L-1)},$$

and $\sigma_{iono,trop}^2$ is a tuning parameter determined empirically. A weighted nonlinear least-squares (WNLS) estimator with weighting matrix $(\bar{R}^K)^{-1}$ is used to estimate $r_{r_R}$ along with A. Let H denote the measurement Jacobian matrix, which is given by $$H = \begin{bmatrix} \frac{\partial}{\partial r_{r_R}} h^K[r_{r_R}] \bar{I}^K \end{bmatrix}.$$

Performance Characterization

This section characterizes the performance of the proposed CD-LEO framework by studying: (i) the PDOP and (ii) the residual ionospheric and tropospheric delays for the Orbcomm constellation.

PDOP Characterization

One important measure of the estimability (or degree of observability) of the rover's position is the position dilution of precision (PDOP), given by PDOP=trace[$P_r$], where Pr corresponds to the top 3×3 block of the matrix $(H^T H)^{-1}$. In the sequel, it is assumed that the rover is equipped with an altimeter; hence it knows its altitude. Subsequently, only the rover's horizontal position is estimated. As a result, the PDOP now corresponds to the horizontal dilution of precision (HDOP).

Figure 7:
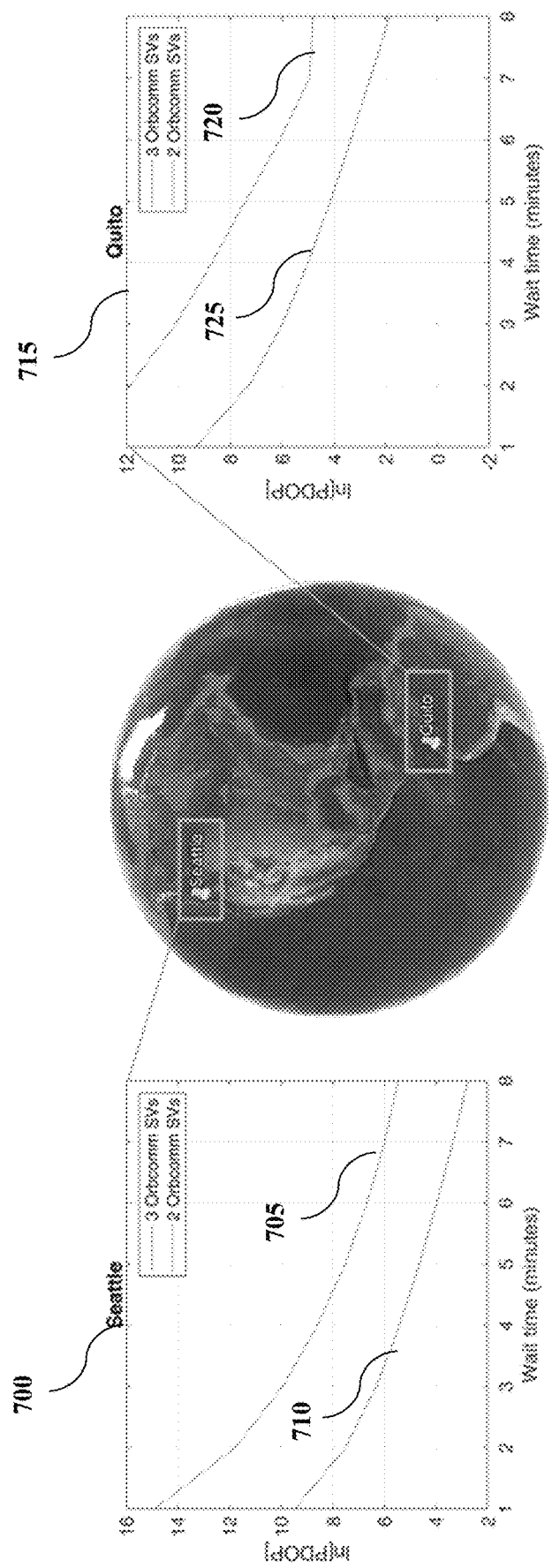
FIG. 7 depicts a graphical representation of a logarithm of PDOP as a function of time at two positions on Earth according to one or more embodiments.

FIG. 7 depicts a graphical representation of a logarithm of PDOP as a function of time at two positions on Earth according to one or more embodiments.

FIG. 7 shows ln [PDOP] for 2 and 3 Orbcomm satellites at two positions on Earth (Seattle, WA, USA, and Quito, Ecuador) as a function of time. Output 700 relates to ln [PDOP] for 2 Orbcomm satellites (shown as 705) and 3 Orbcomm satellites (shown as 710) relative to Seattle. Output 715 relates to ln [PDOP] for 2 Orbcomm satellites (shown as 720) and 3 Orbcomm satellites (shown as 725) relative to Seattle. At two positions on Earth (Seattle, WA, USA, and Quito, Ecuador) as a function of time.

Figure 8:
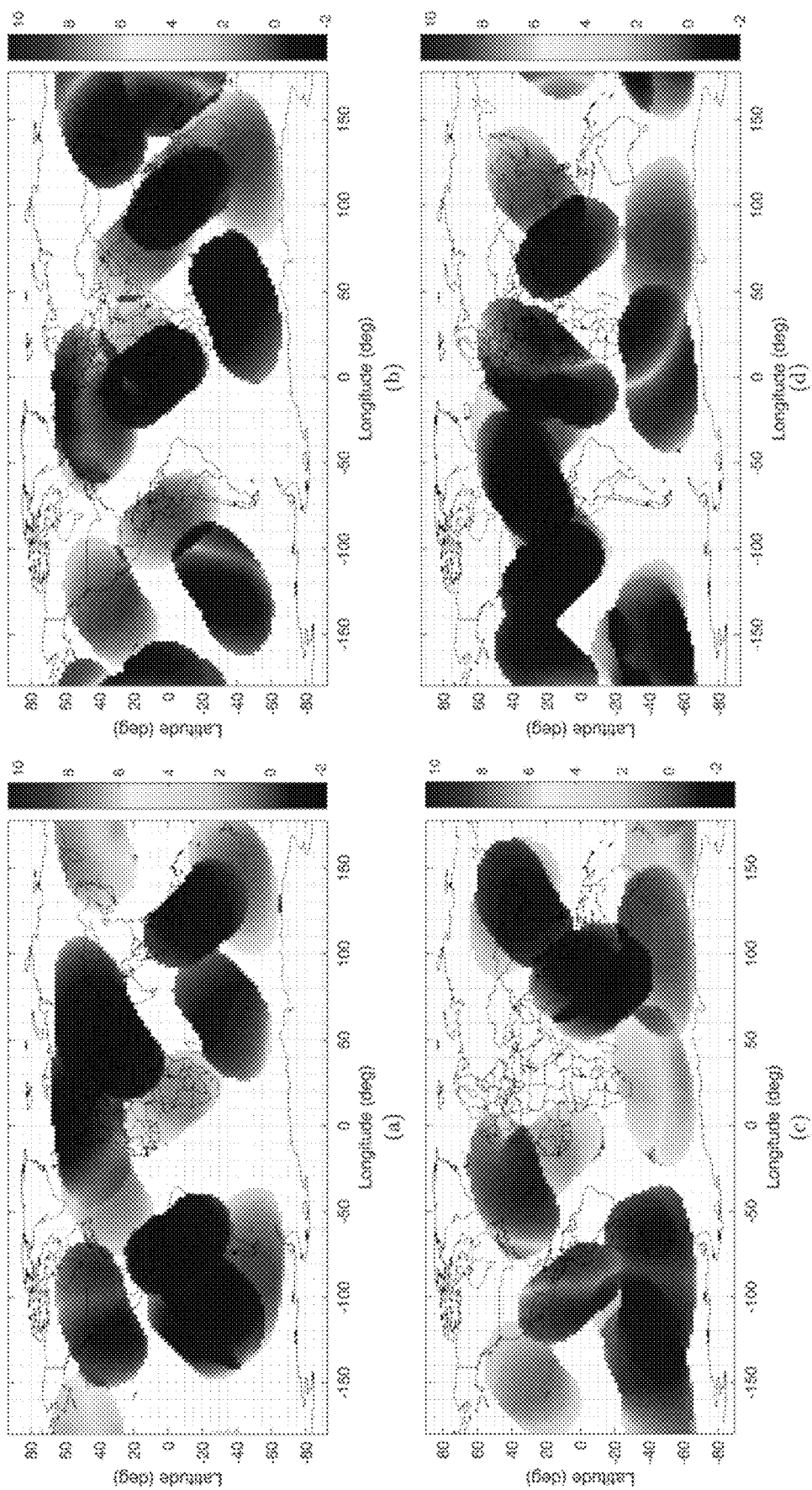
FIG. 8 depicts a heat map according to one or more embodiments.

Next, heat maps of ln [PDOP] are generated for the entire globe starting midnight on Jun. 27, 2019, UTC time. Four maps are generated, each 30 minutes apart, showing the PDOP obtained after an 8-minute wait time, and are shown in FIG. 8. FIG. 8 depicts a heat map of n i[PDOP] for the Orbcomm constellation and a wait time of 8 minutes. (a)-(d): The heat map is computed 4 times at 30 minute intervals, starting at midnight on Jun. 27, 2019, UTC time.

Figure 9:
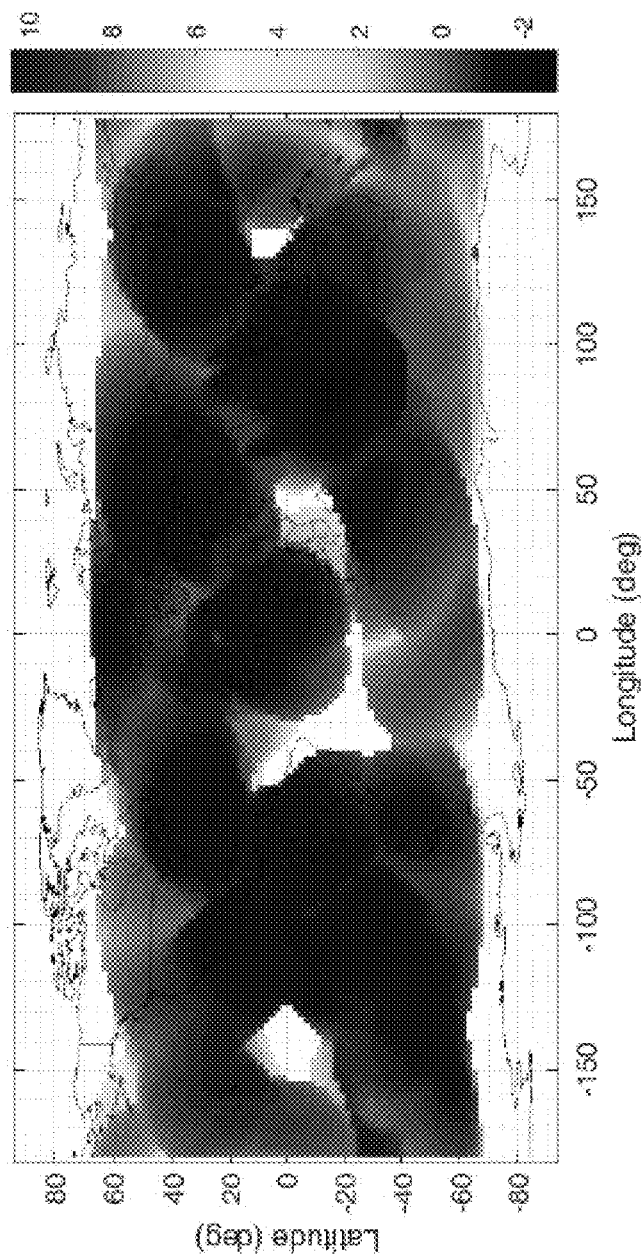
FIG. 9 depicts another heat map according to one or more embodiments.

FIG. 9 illustrates a combined heat map combining the 4 heat maps of FIG. 8. It can be seen from FIG. 8 and FIG. 9 that a less than unity PDOP can be achieved for an 8-minute wait time, implying submeter-accurate positioning with Orbcomm satellites.

Ionospheric and Tropospheric Delay Residuals

Figure 10:
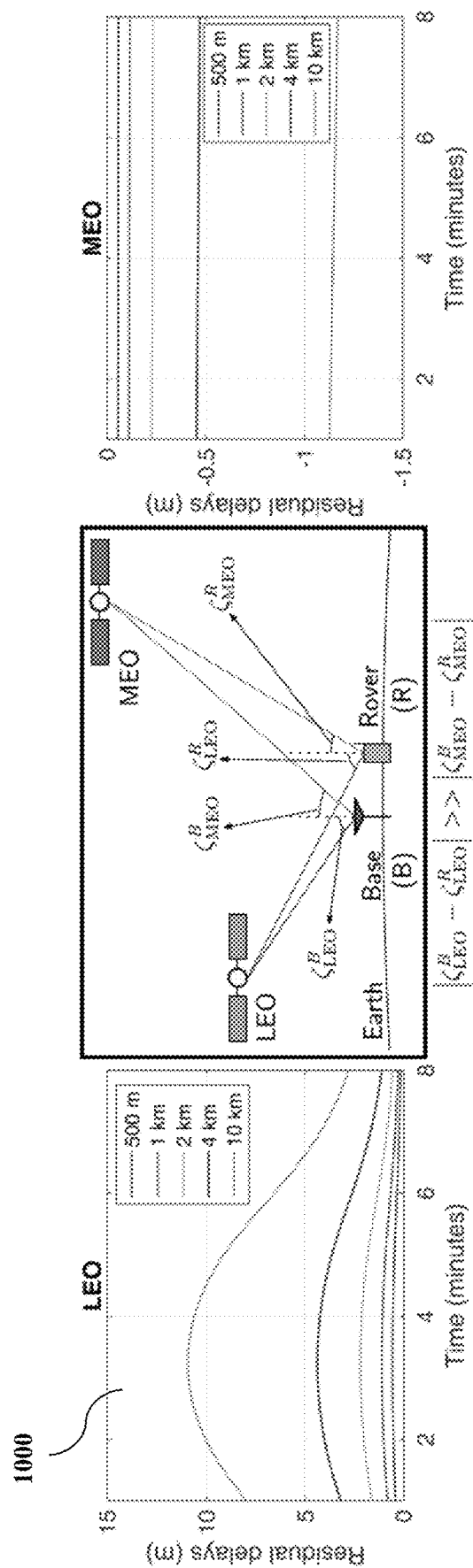
FIG. 10 depicts ionospheric delays according to one or more embodiments.

Embodiments discussed herein account for ionospheric and tropospheric delay residuals as a function of the baseline (i.e., the distance between the base and the rover). The residual delays 1000 are significant in the case of Orbcomm LEO satellites since the obliquity factor changes significantly between different points on Earth, as illustrated in FIG. 10. It was observed through simulations that a baseline of 2 km or less will keep the residual delays below 2 meters. FIG. 10 depicts ionospheric delays observed by a terrestrial receiver for GPS and Orbcomm LEO satellites for varying baselines: 500 m, 1 km, 2 km, 4 km, and 8 km. The zenith angle is defined as, ir/2-8, where 8 is the elevation angle.

Experimental Results

Experimental results are discussed demonstrating positioning with the CD-LEO framework developed in this disclosure. Only the 2—D position of the rover is estimated as its altitude may be obtained using other sensors (e.g., altimeter). In the following experiments, the altitude of the rover was obtained from its surveyed location.

Moreover, the noise equivalent bandwidths of the receivers' PLLs were set to $$B_{R,PLL} = B_{B,PLL} = B_{PLL} = 18 Hz.$$

Figure 11:
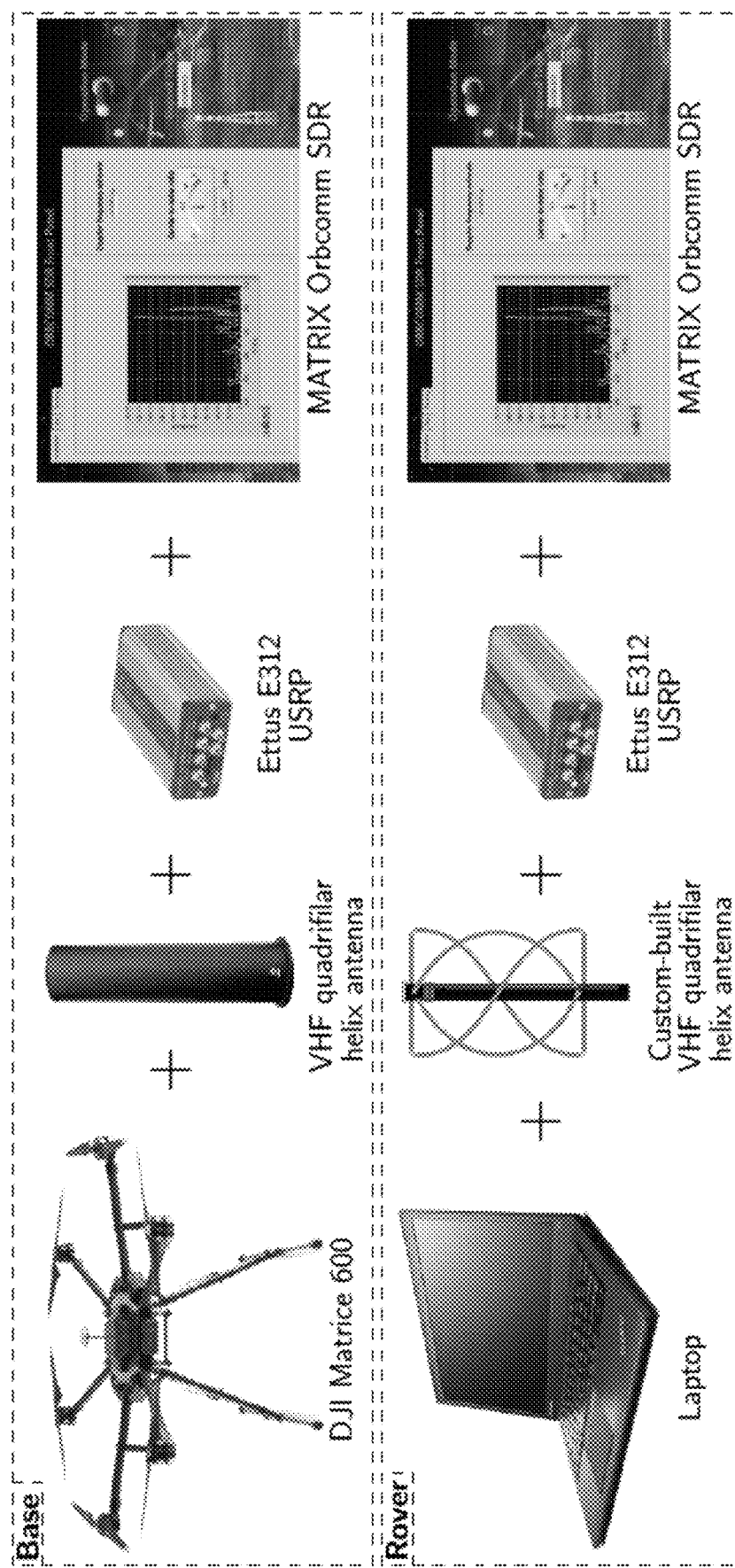
FIG. 11 depicts a base/rover experimental setup of the CD-LEO framework according to one or more embodiments.

An experimental setup is shown in FIG. 11 including a base/rover experimental setup of the CD-LEO framework according to one or more embodiments. In order to demonstrate the CD-LEO framework, the base, which was a DJI Matrice 600 UAV, was equipped with an Ettus E312 USRP, a high-end VHF antenna, and a small consumer-grade GPS antenna to discipline the on-board oscillator. The rover, which was a stationary receiver, was equipped with an Ettus E312 USRP, a custom-made VHF antenna, and a small consumer-grade GPS antenna to discipline the on-board oscillator. The receivers were tuned to a 137 MHz carrier frequency with more than 1 MHz sampling bandwidth, which covers the 137-138 MHz band allocated to Orbcomm SVs. Samples of the received signals were stored for off-line post-processing using a modified version of the software-defined radio (SDR) developed in. The LEO carrier phase measurements were given at a rate of 4.8 kHz and were downsampled to 1 Hz. The ground-truth reference for the rover was surveyed on Google Earth, and the base UAV trajectory was taken from its on-board navigation system, which uses GNSS (GPS and GLONASS), an inertial measurement unit (IMU), and other sensors.

According to one embodiment, the experimental setup provides an example of opportunistic navigation with single difference CD-LEO measurements for a mobile rover receiver. Experimental results of a UAV navigating with signals from Orbcomm LEO SVs via the CD-LEO framework are discussed including implementation of navigation frameworks and presentation of results.

Figure 12:
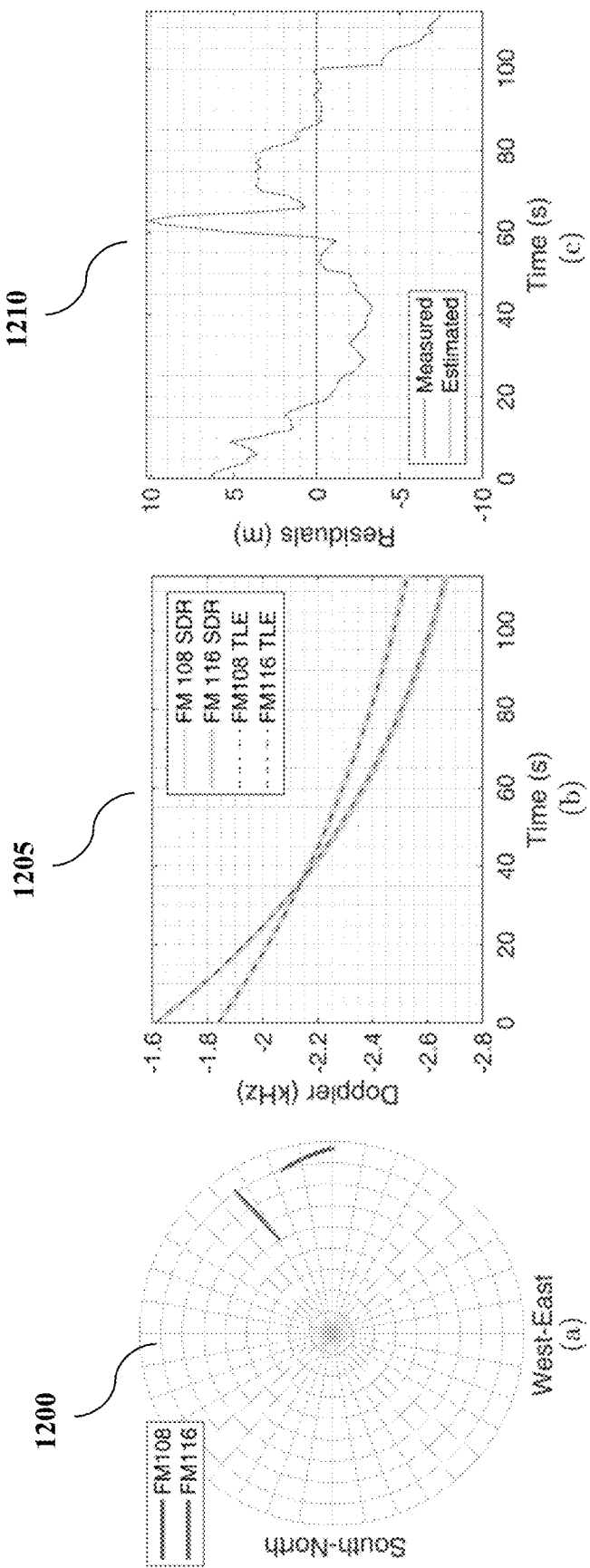
FIG. 12 depicts graphical representations of a skyplot, Doppler frequency values, and measurement residual values according to one or more embodiments.

FIG. 12 depicts graphical representations of a skyplot, Doppler frequency values, and measurement residual values according to one or more embodiments. Element 1200 (a) is Sky plot showing the geometry of the 2 Orbcomm SVs during the experiment. Element 1205 (b) is measured Doppler frequencies using the proprietary SDR and the expected Doppler calculated from the TLE for both Orbcomm SVs. Element 1210 (c) is measured and estimated ionospheric and tropospheric residual delays.

The SVs transmit their position as estimated by their on-board GPS receivers. These positions were decoded and used as ground-truth. A position estimate of FM 108 and FM 116 was also obtained from TLE files and SGP4 software. The satellites were simultaneously visible for 2 minutes. A sky plot of the 2 Orbcomm SVs is shown as 1200 including SV trajectories. The Doppler frequency measured by the rover using the SDR for the 2 Orbcomm SVs is shown along the expected Doppler calculated from the TLE files as 1205.

In the experiment, the rover waited 114$s$ to produce a position estimate. Over the course of the experiment, the receivers on-board the base and the rover were listening to 2 Orbcomm SVs, namely FM 108 and FM 116, whose positions were decoded from the transmitted ephemeris and interpolated at 1 Hz rate. The Doppler frequency measured by the rover using the SDR for the 2 Orbcomm SVs is shown along the expected Doppler calculated from the TLE files in chart 1205. The measured ionospheric and tropospheric delay residuals between the rover and base are shown with the estimated residual delays using the models described herein and are shown in chart 1210. It can be seen that the estimated residual delays are negligible. The measured residual delays are mainly due to unmodeled errors. Note that the base was mobile during the experiment and the position returned by its on-board navigation system was used as ground-truth. Consequently, any errors in the UAV's navigation solution would have reflected in the residual delays and degraded the rover's position estimate. The UAV traversed a total trajectory of 2.28 km in 120 seconds.

Since only 2 satellites were visible at a time, which is the case with many of the current LEO constellations, an extended Kalman filter (EKF) was used to estimate the three-dimensional (3-D) position and velocity of the UAV from single difference measurements. To demonstrate the potential of the CD-LEO navigation framework, two frameworks were implemented for comparison: (i) a modified version of the CD-LEO framework and (ii) a non-differential framework that employs carrier phase LEO measurements from the UAV's receiver only. The results of each framework are presented next.

Figure 13A:
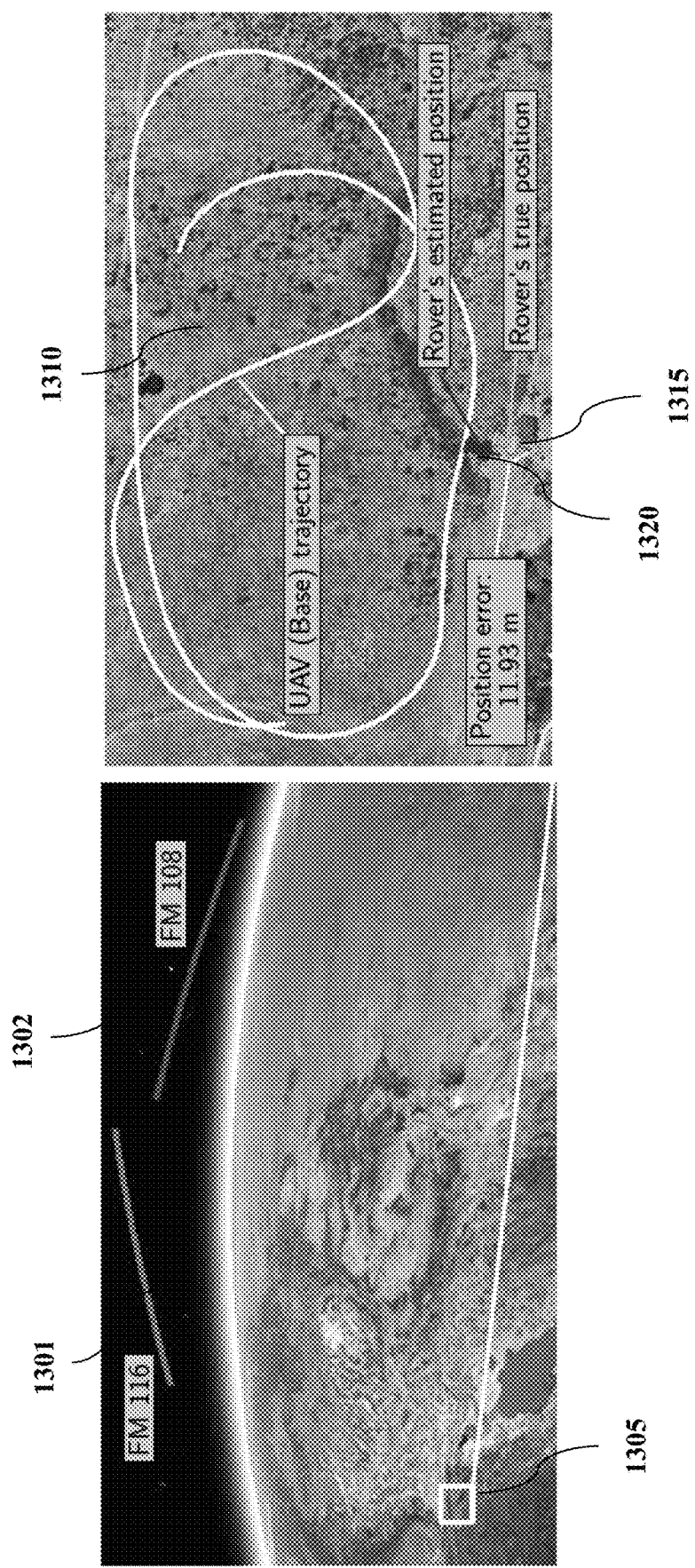
FIG. 13A depicts a graphical representation of trajectory according to one or more embodiments.

FIG. 13A depicts a trajectory according to one or more embodiments of the 2 Orbcomm SVs 1301 and 1302 during an experiment for receiver 1305. Trajectory 1310 is shown of a UAV (base trajectory), and the rover's true position 1315 and estimated position 1320. The CD-LEO measurements were used to estimate the rover's position via the base/rover framework described herein. The SVs' trajectories, the true and estimated rover position, as well as the base UAV trajectory are shown in FIG. 13. The position error was found to be 11.93 m. The PDOP was found to be 29.17. Assuming a precision of $\lambda/2$ in the CD-LEO measurements, it is found that the position error obtained in this experiment is well below the 1-$\sigma$ bound.

Single difference measurements provide more information on the SV-to-receiver geometry than double difference measurements since the differencing matrix T is not applied. This comes at the cost of an additional state to be estimated: The common clock bias $\delta t_r^{(R,B)}(k)$. To this end, the UAV's position and velocity states were estimated along with the common clock bias $\delta t_r^{(R,B)}(k)$. And constant ambiguity $N_2^{(R,B)}$. Note that $N_1^{(R,B)}$ was lumped into $\delta t_r^{(R,B)}(k)$. The UAV's position and velocity were assumed to evolve according to a nearly constant velocity model, and the common clock state was assumed to evolve according to the standard model of double integrator driven by noise. A prior for the UAV position and velocity was obtained from the UAV's on-board system. The prior was used to initialize the EKF. After initialization, the EKF was using single-difference Orbcomm LEO SV measurements to estimate the states of the UAV.

Figure 13B:
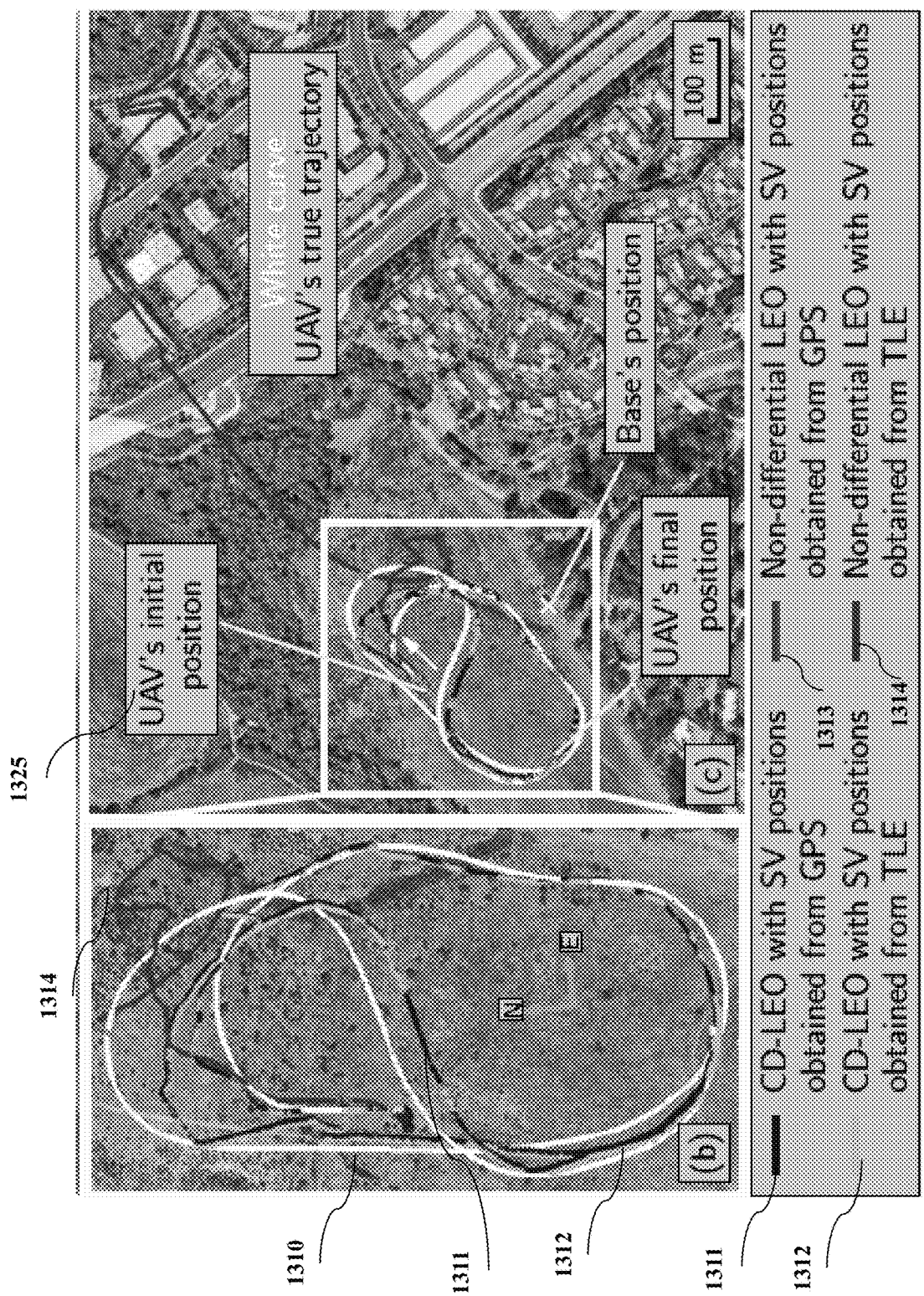
FIG. 13B depicts a graphical representation of trajectory according to one or more embodiments.

FIG. 13B depicts a graphical representation of UAV trajectory and estimated trajectories according to one or more embodiments. UAV base trajectory is shown as trajectory 1310 and initial position of he UAV is shown as 1325. To study the effect of ephemeris errors on the navigation solution, two EKFs were implemented: (i) one that uses the Orbcomm LEO SV positions estimated by the SVs' on-board GPS receiver and (ii) one that uses the Orbcomm LEO SV positions estimated from TLE files. Estimated trajectory based on a CD-LEO with SV positions obtained from GPS is shown as 1311. Estimated trajectory based on a CD-LEO with SV positions obtained from TLE is shown as 1312. Estimated trajectory based on a non-differential LEO with SV positions obtained from GPS is shown as 1313. Estimated trajectory based on a non-differential LEO with SV positions obtained from GPS is shown as 1314. FIG. 13B illustrates a final position of the UAV and base position.

Figure 14:
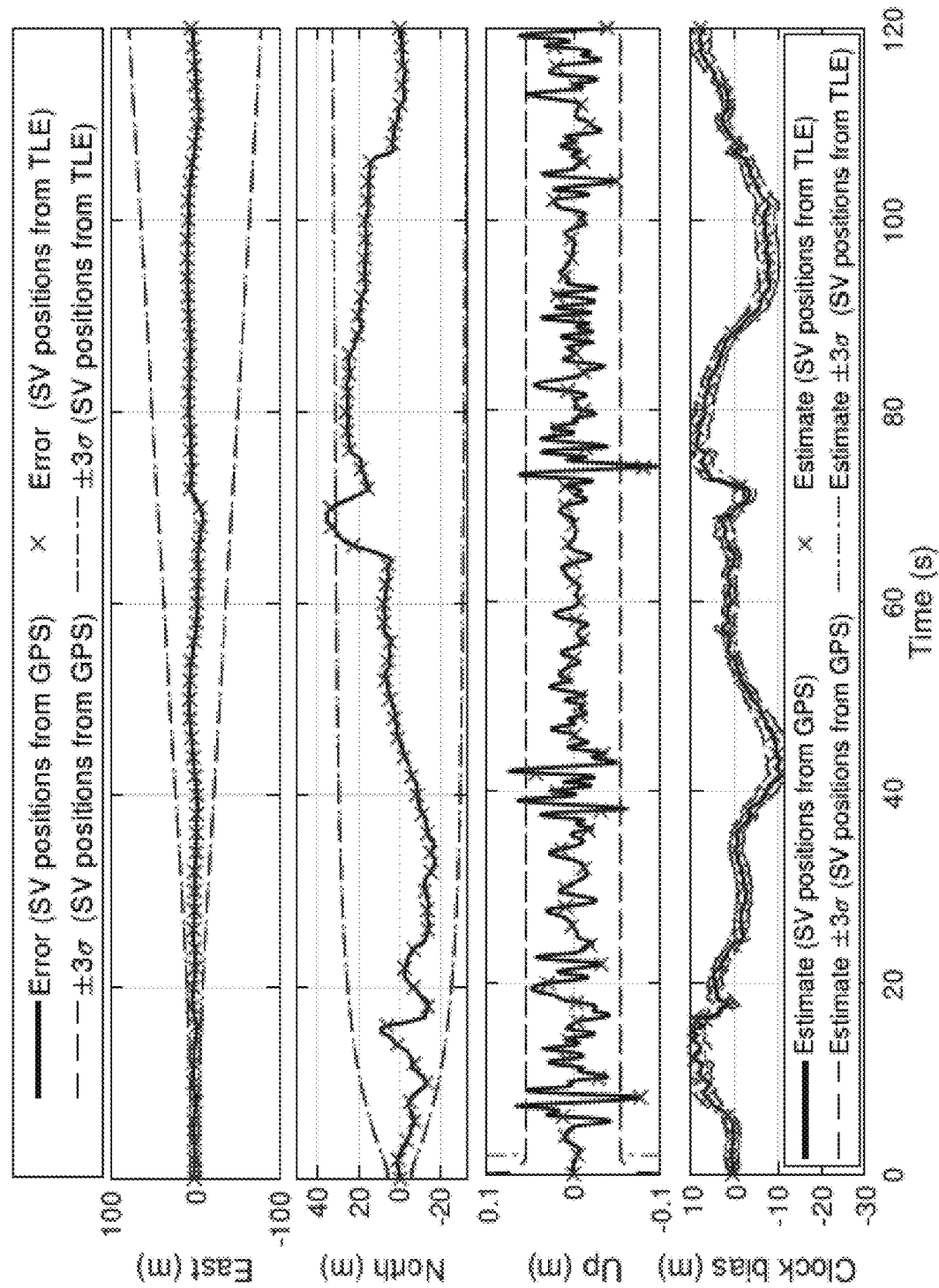
FIG. 14 depicts a graphical representation of EKF position errors according to one or more embodiments.

FIG. 14 depicts a graphical representation of EKF position errors according to one or more embodiments. The EKF position estimation errors are shown along with the $3\sigma$ bounds. Since the UAV mainly travels in the North direction, the East direction poorly estimated; hence, the 30 bounds in the East direction increase at a higher rate than the 36 bound in the North direction, as shown in FIG. 14. The common clock bias estimate and the corresponding $\pm 3\sigma$ bounds are also shown in FIG. 14. The 3-D position root mean squared errors (RMSEs) and final errors for both EKFs are shown in Table II.

Non-Differential LEO Framework Experimental Results

Figure 15:
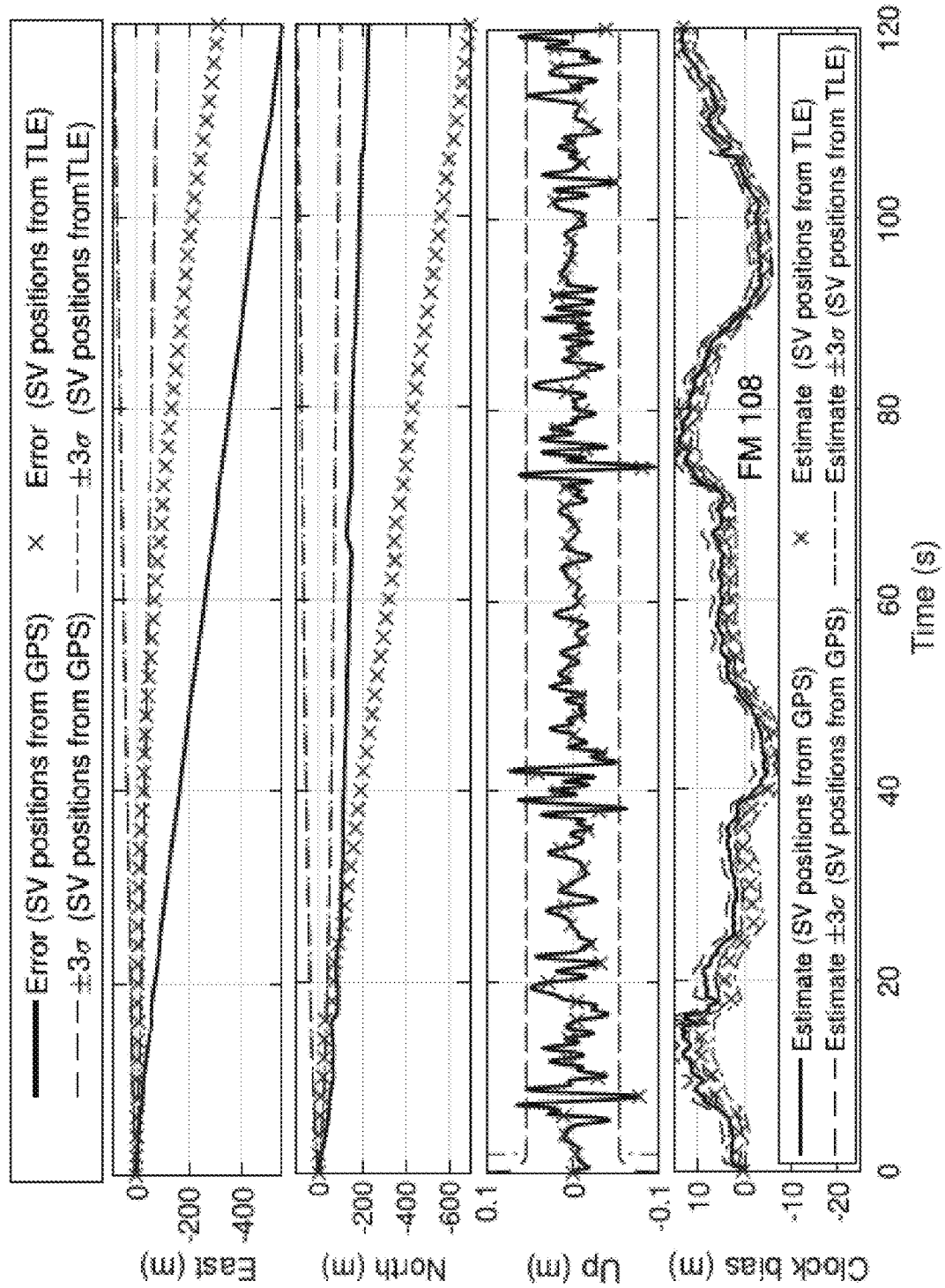
FIG. 15 depicts a graphical representation of EKF position errors according to one or more embodiments.

To demonstrate the importance of the CD-LEO framework, a non-differential LEO framework is implemented. To this end, the UAV's position and velocity are estimated in an EKF using the non-differential measurements. In this case, two clock biases must be estimated capturing the difference between the receiver's clock bias and each of the Orbcomm LEO SVs' bias. The same dynamics models and initialization method were used in the non-differential framework. As such, two EKFs were implemented: (i) one that uses the Orbcomm LEO SV positions estimated by the SVs' on-board GPS receiver and (ii) one that uses the Orbcomm LEO SV positions estimated from TLE files. The estimated trajectories are shown in FIG. 13B. FIG. 15 depicts a graphical representation of EKF position errors along with the associated 30 bounds. The clock bias estimate associated with FM 108 and the corresponding $\pm 3\sigma$ bounds are also shown in FIG. 14. The 3D position RMSEs and final errors for both EKFs are shown in Table II.

TABLE II

EXPERIMENTAL RESULTS RMSEs AND FINAL ERRORS

| Framework | SV position source | RMSE (m) | Final error (m) |
|---|---|---|---|
| CD-LEO | GPS | 14.8 | 3.9 |
| CD-LEO | TLE | 15.0 | 4.8 |
| Non-differential | GPS | 338.6 | 590.4 |
| Non-differential | TLE | 405.4 | 759.5 |

Table II summarizes the experimental results for the CD-LEO and non-differential LEO frameworks. Residuals in the non-differential carrier phase measurements are on the order of kilometers, which explains the unacceptably large RMSEs of the non-differential framework. While using the SV positions transmitted by the Orbcomm SVs reduces the RMSEs, the errors remain unacceptably large in the non-differential framework due to other unmodeled errors. Such errors cancel out in the CD-LEO framework, yielding acceptable performance whether SV positions from GPS or TLE are used. The accuracy of these results is unprecedented, considering that (i) only 2 LEO SVs were used, (ii) no other sensors were fused into the navigation, and (iii) these LEO SVs are not intended for navigation and are exploited opportunistically.

Figure 16:
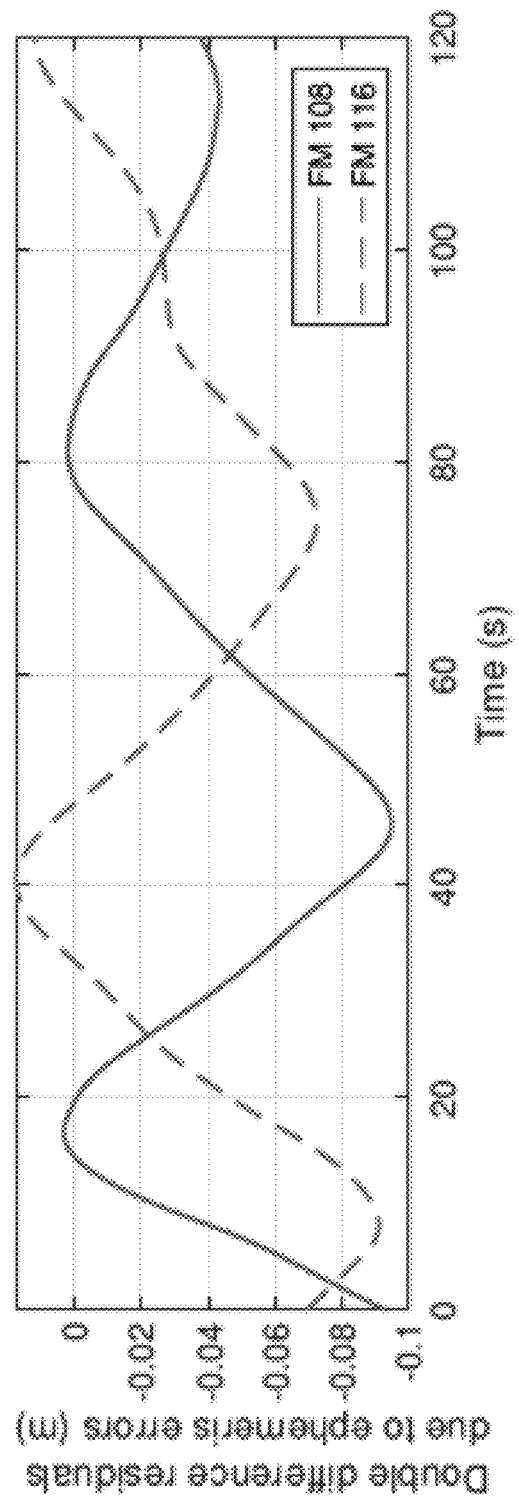
FIG. 16 depicts a graphical representation of double difference residuals according to one or more embodiments.

FIG. 16 depicts a graphical representation of double difference residuals due to ephemeris errors was calculated. During the experiment, the baseline varied between 20 m and 200 m. The function $g(\theta, \alpha)$ averages to 1.346 for the Orbcomm constellation, which has an inclination angle of 45° and orbital altitude of 800 km and $\Theta_{min}=5°$. The expected range of the residuals is from 0.3 to 16 cm. It can be seen from FIG. 16 that the magnitude of the double difference residual is on the order of centimeters and matches the expected values, showing (i) the robustness of the CD-LEO framework against ephemeris errors and (ii) the accuracy of the performance analysis framework discussed.

CONCLUSION

This disclosure provides a framework for positioning with CD-LEO measurements. The base/rover framework focuses on the Orbcomm constellation and does not require prior knowledge of the rover's position. The effect of ionospheric and tropospheric delays on the carrier phase and CD-LEO measurements were discussed. The residual ionospheric and tropospheric delays were studied as a function of the baseline, and it was found that a baseline of 2 km or less keeps the residual delays negligible. Moreover, the PDOP was studied for the Orbcomm constellation, and it was found that a less than unity PDOP may be achieved for 8-minute wait times. An experiment was conducted showing a receiver positioning itself exclusively with CD-LEO measurements from 2 Orbcomm SVs with a position error of 11.93 m.

While this disclosure has been particularly shown and described with references to exemplary embodiments thereof, it will be understood by those skilled in the art that various changes in form and details may be made therein without departing from the scope of the claimed embodiments.

What is claimed is:

1. A method for determining position based on low Earth orbit (LEO) satellite signals, the method comprising:
receiving, by a device, one or more low earth orbit (LEO) satellite signals, wherein the LEO satellite signals include direct quadrature phase shift keying (QPSK) signals;
performing, by the device, a Doppler frequency measurement for the quadrature phase shift keying (QPSK) signals for each downlink channel received, wherein the Doppler frequency measurement includes
filtering each received downlink channel, and
performing a channel tracking operation for each filtered downlink channel, the channel tracking operation including an independent phase-lock loop to track each filtered downlink signal, wherein each phase-lock loop determines a Doppler shift measurement; and
performing, by the device, a navigation filter operation to determine clock drift based on each Doppler shift measurement from each channel tracking loop; and determining, by the device, a position of the device, wherein the device determines position based on clock drift determined by the navigation filter operation and tracking data for each LEO satellite signal source.

2. The method of claim 1, wherein the channel tracking operation provides a downlink channel Doppler frequency estimate to the navigation filter operation to determine clock drift between a LEO satellite and the device.

3. The method of claim 1, wherein the channel tracking operation includes an integrate and dump filter, a channel phase discriminator, and a channel loop filter in series, and a feedback loop including a numerically controller oscillator.

4. The method of claim 1, wherein determining a position of the device is based on altimeter data detected for the device, and LEO satellite data including a velocity vector and position for each LEO satellite.

5. The method of claim 1, wherein the navigation filter operation includes at least one of an extended Kalman filter and weighted non-linear least-squares (WNLS) estimator.

6. The method of claim 1, further comprising receiving base receiver position data and carrier phase data from a base receiver, wherein position of the device is determined based on a carrier phase differential operation with the base receiver position data and the carrier phase data as input.

7. The method of claim 6, wherein the base receiver is at least one of a mobile receiver and stationary receiver, and wherein the device is configured to receive the base receiver position data and carrier phase data from the base receiver.

8. The method of claim 1, wherein determining position includes canceling at least one of ionospheric delay and toropospheric delay from received satellite signals.

9. The method of claim 1, wherein position is determined for the device when stationary and measurement collected at different times in a batch estimator.

10. The method of claim 1, wherein a double-difference operation is performed to obtain carrier phase measurement differences from multiple LEO satellites.

11. A device configured to determine position based on low Earth orbit (LEO) satellite signals, the device comprising:
a communications module configured to receive one or more low earth orbit (LEO) satellite signals, wherein the LEO satellite signals include direct quadrature phase shift keying (QPSK) signals; and
a controller, coupled to the communications module, wherein the controller is configured to
perform a Doppler frequency measurement for the quadrature phase shift keying (QPSK) signals for each downlink channel received, wherein the Doppler frequency measurement includes
filter each received downlink channel, and
performing a channel tracking operation for each filtered downlink channel, the channel tracking operation including an independent phase-lock loop to track each filtered downlink signal, wherein each phase-lock loop determines a Doppler shift measurement; and
perform a navigation filter operation to determine clock drift based on each Doppler shift measurement from each channel tracking loop; and
determine a position of the device, wherein the device determines position based on clock drift determined by the navigation filter operation and tracking data for each LEO satellite signal source.

12. The device of claim 11, wherein the channel tracking operation provides a downlink channel Doppler frequency estimate to the navigation filter operation to determine clock drift of the device.

13. The device of claim 11, wherein the channel tracking operation includes an integrate and dump filter, a channel phase discriminator, and a channel loop filter in series, and a feedback loop including a numerically controller oscillator.

14. The device of claim 11, wherein determining a position of the device is based on altimeter data detected for the device, and LEO satellite data including a velocity vector and position for each LEO satellite.

15. The device of claim 11, wherein the navigation filter operation includes at least one of an extended Kalman filter and weighted non-linear least-squares (WNLS) estimator.

16. The device of claim 11, further comprising receiving base receiver position data and carrier phase data from a base receiver, wherein position of the device is determined based on a carrier phase differential operation with the base receiver position data and the carrier phase data as input.

17. The device of claim 16, wherein the base receiver is at least one of a mobile receiver and stationary receiver, and wherein the device is configured to receive the base receiver position data and carrier phase data from the base receiver.

18. The device of claim 11, wherein determining position includes canceling at least one of ionospheric delay and toropospheric delay from received satellite signals.

19. The device of claim 11, wherein position is determined for the device when stationary and measurement collected at different times in a batch estimator.

20. The device of claim 11, wherein a double-difference operation is performed to obtain carrier phase measurement differences from multiple LEO satellites.

* * * * *